(12) United States Patent
Lian et al.

(10) Patent No.: US 10,781,890 B2
(45) Date of Patent: Sep. 22, 2020

(54) POWER-DRIVEN SYSTEM AND VEHICLE HAVING THE SAME

(71) Applicant: BYD COMPANY LIMITED, Shenzhen, Guangdong (CN)

(72) Inventors: Yubo Lian, Shenzhen (CN); Heping Ling, Shenzhen (CN); Zhen Zhai, Shenzhen (CN); Youbin Xu, Shenzhen (CN); Feng Zheng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 114 days.

(21) Appl. No.: 16/014,099

(22) Filed: Jun. 21, 2018

(65) Prior Publication Data
US 2018/0298994 A1 Oct. 18, 2018

Related U.S. Application Data

(63) Continuation of application No. PCT/CN2016/110152, filed on Dec. 15, 2016.

(30) Foreign Application Priority Data

Dec. 25, 2015 (CN) .......................... 2015 1 0995547

(51) Int. Cl.
*B60K 6/52* (2007.10)
*F16H 3/72* (2006.01)
(Continued)

(52) U.S. Cl.
CPC .............. *F16H 3/728* (2013.01); *B60K 1/02* (2013.01); *B60K 6/365* (2013.01); *B60K 6/387* (2013.01);
(Continued)

(58) Field of Classification Search
CPC ...... F16H 3/728; F16H 48/36; Y02T 10/6239; B60Y 2006/381; B60Y 2200/92;
(Continued)

(56) References Cited

U.S. PATENT DOCUMENTS 6,962,545 B2 * 11/2005 Larkin ................... B60K 6/365
475/5
8,046,142 B2 * 10/2011 Morris .................. B60W 30/20
701/29.1
(Continued)

FOREIGN PATENT DOCUMENTS

CN          1946584 A      4/2007
CN       201651189 U      11/2010
(Continued)

OTHER PUBLICATIONS

International Search Report and Written Opinion for Application No. PCT/CN2016/110152, dated Mar. 14, 2017, 10 pages.

*Primary Examiner* — Leslie A Nicholson, III

(57) ABSTRACT

The present disclosure discloses a power-driven system and a vehicle. The power-driven system includes: a power coupling device, where the power coupling device includes a first sun gear, a first planet carrier, a first ring gear, a second sun gear, a second planet carrier, a second ring gear, and a power transmission part; a power source; a first motor generator and a second motor generator; and a first braking device directly or indirectly braking the power transmission part. The power transmission part is coaxially linked to the first sun gear and the second sun gear. The power source is configured to selectively connect to the power transmission part. The first motor generator is linked to the first ring gear, and the second motor generator is linked to the second ring gear.

20 Claims, 6 Drawing Sheets

(51) Int. Cl.
- *B60K 6/365* (2007.10)
- *B60K 6/387* (2007.10)
- *B60K 6/442* (2007.10)
- *B60K 7/00* (2006.01)
- *B60K 17/02* (2006.01)
- *B60K 17/08* (2006.01)
- *B60K 1/02* (2006.01)
- *B60K 6/445* (2007.10)
- *F16H 48/36* (2012.01)
- *B60K 6/38* (2007.10)

(52) U.S. Cl.
CPC .............. *B60K 6/442* (2013.01); *B60K 6/445* (2013.01); *B60K 6/52* (2013.01); *B60K 7/0007* (2013.01); *B60K 17/02* (2013.01); *B60K 17/08* (2013.01); *B60K 2006/381* (2013.01); *B60Y 2200/92* (2013.01); *F16H 48/36* (2013.01); *Y02T 10/6239* (2013.01)

(58) Field of Classification Search
CPC .......... B60K 1/02; B60K 6/365; B60K 6/387; B60K 6/442; B60K 6/445; B60K 6/52; B60K 7/0007; B60K 17/02; B60K 17/08
USPC ............................................................. 475/5
See application file for complete search history.

(56) References Cited

U.S. PATENT DOCUMENTS

| | | | |
|---|---|---|---|
| 9,114,699 B2* | 8/2015 | Takei | B60K 6/365 |
| 9,254,739 B2* | 2/2016 | Uchida | B60K 6/42 |
| 9,713,955 B2* | 7/2017 | Kanada | B60K 6/365 |
| 9,963,029 B1* | 5/2018 | Duan | B60K 6/365 |
| 10,066,718 B2* | 9/2018 | Imamura | B60L 3/0046 |
| 2014/0256493 A1 | 9/2014 | Knoblauch | |
| 2015/0105201 A1* | 4/2015 | Park | B60K 6/365 |
| | | | 475/5 |
| 2015/0337937 A1 | 11/2015 | Rodriguez | |
| 2016/0230850 A1* | 8/2016 | Kanada | F16H 61/0265 |
| 2017/0015298 A1* | 1/2017 | Imamura | B60L 3/0061 |

FOREIGN PATENT DOCUMENTS

| | | |
|---|---|---|
| CN | 101985279 A | 3/2011 |
| CN | 102229319 A | 11/2011 |
| CN | 102514477 A | 6/2012 |
| CN | 102922982 A | 2/2013 |
| CN | 203305831 U | 11/2013 |
| CN | 204055299 U | 12/2014 |
| CN | 104276030 A | 1/2015 |
| CN | 204323058 U | 5/2015 |
| DE | 102009031215 A1 | 1/2011 |
| EP | 1764253 A1 | 3/2007 |
| JP | 2010190286 A | 9/2010 |
| KR | 101028400 B1 | 4/2011 |
| WO | 2004022373 A1 | 3/2004 |
| WO | 2013/017219 A1 | 2/2013 |

* cited by examiner

POWER-DRIVEN SYSTEM AND VEHICLE HAVING THE SAME

CROSS-REFERENCE TO RELATED APPLICATIONS

This application is a continuation application of International Application No. PCT/CN2016/110152, filed on Dec. 15, 2016, which is based on and claims priority to and benefits of Chinese Patent Application No. 201510995547.4, filed with the State Intellectual Property Office (SIPO) of P. R. China on Dec. 25, 2015. The entire contents of the above-identified applications are incorporated herein by reference.

FIELD

The present disclosure relates to the field of automotive engineering, and in particular, to a power-driven system and a vehicle having the same.

BACKGROUND

In the related art, a transmission device used in a vehicle includes a pair of differential mechanisms and a pair of motors, and a differential mechanism includes a sun gear, a planet gear, a planet carrier, and an inner ring gear. Power output by an engine is input to sun gears of the pair of differential mechanisms after an intermediate transmission structure performs speed changing. The pair of motors respectively input driving force to inner ring gears of the pair of differential mechanisms. In this transmission device, a conventional mechanical differential component is not used, and two epicyclic gearings are used to implement power coupling between two motors and the engine.

However, the foregoing transmission device is applicable to a work vehicle (for example, a snow sweeper). An output mechanism of the motor is a worm gear, and unidirectionality of power transmission of the motor is implemented with self locking. This is used in only a turning differential when a vehicle goes around a corner, but cannot be implemented in work conditions such as a full electric working condition, a hybrid working condition, and a stationary power generation working condition.

SUMMARY

The present disclosure is to resolve one of the foregoing technical problems in the existing technology.

The present disclosure provides a power-driven system. The power-driven system implements a differential function under the premise of cancelling a conventional mechanical differential, and has abundant transmission modes.

The present disclosure further provides a vehicle, where the vehicle has the foregoing power-driven system.

The power-driven system in an embodiment of the present disclosure includes: a power coupling device, where the power coupling device includes a first sun gear, a first planet carrier, a first ring gear, a second sun gear, a second planet carrier, a second ring gear, and a power transmission part, the power transmission part being coaxially linked to the first sun gear and the second sun gear; a power source, where the power source is configured to selectively connect to the power transmission part; a first motor generator and a second motor generator, where the first motor generator is linked to the first ring gear, and the second motor generator is linked to the second ring gear; and a first braking device directly or indirectly braking the power transmission part.

The power-driven system in this embodiment of the present disclosure implements a differential function under the premise of cancelling a conventional mechanical differential, and has abundant transmission modes.

The vehicle in another embodiment of the present disclosure includes the power-driven system in the foregoing embodiment.

BRIEF DESCRIPTION OF THE DRAWINGS

These and other aspects and advantages of embodiments of the present disclosure will become apparent and more readily appreciated from the following descriptions made with reference to the drawings.

DETAILED DESCRIPTION

Figure 1:
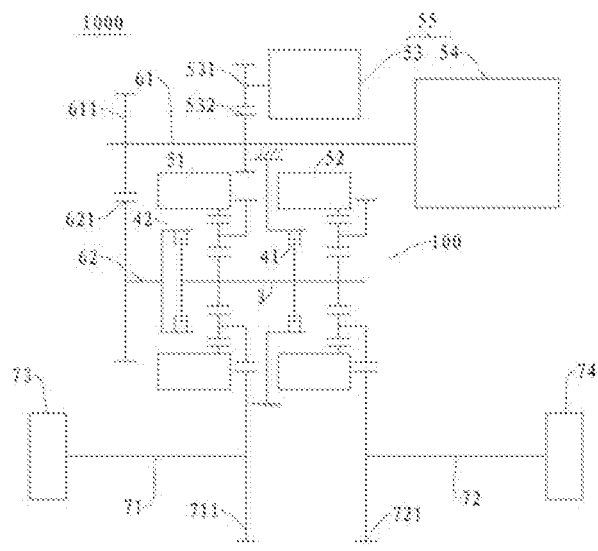
FIG. 1 is a schematic diagram of a power-driven system according to an embodiment of the present disclosure.

The following describes in detail the embodiments of the present disclosure. Examples of the embodiments are shown in the accompanying drawings, and same or similar numbers represent same or similar elements or elements having same or similar functions. The embodiments described below with reference to the accompanying drawings are exemplary, and are intended to explain the present disclosure, but cannot be understood as a limitation to the present disclosure.

In the description of the present disclosure, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that a device or an element must have a particular direction or must be constructed and operated in a particular direction, and therefore, cannot be understood as a limitation to the present disclosure.

In addition, terms "first" and "second" are merely used to describe the objective, but cannot be understood as indicating or implying relative importance or implying a quantity of indicated technical features. Therefore, features limited by "first" and "second" may indicate explicitly or implicitly that one or more features are included. In the description of the present disclosure, unless otherwise specifically limited, "multiple" means at least two, for example, two or three.

In the present disclosure, unless otherwise clearly stipulated and limited, terms "mount", "connect", and "fix" should be understood in a generalized manner, for example, may be understood as fixed connection, detachable connection, or integration; or may be understood as mechanical connection, electrical connection, or mutual communication; or may be understood as direct connection, or indirect connection with a medium, or internal communication of two elements or a mutual relationship between two elements. A person of ordinary skill in the art may understand specific meanings of the terms in the present disclosure according to specific situations.

In the present disclosure, unless otherwise clearly stipulated and limited, that a first feature is "above" or "below" a second feature may include that the first feature directly contacts the second feature, or may include that the first feature does not contact the second feature directly but contacts the second feature with another feature between them. In addition, that the first feature is "above" the second feature includes that the first feature is right above the second feature and is not right above the second feature, or merely represents that a horizontal height of the first feature is higher than the second feature. That the first feature is "below" the second feature includes that the first feature is right below the second feature and is not right below the second feature, or merely represents that a horizontal height of the first feature is lower than the second feature.

The following describes a power-driven system 1000 in an embodiment of the present disclosure with reference to the accompanying drawings. The power-driven system 1000 is applicable to a vehicle 10000, for example, a hybrid electric vehicle 10000. The power-driven system 1000 may be used as a power source of the vehicle 10000 and provide power required for normal driving of the vehicle 10000.

The following describes in detail the power-driven system 1000 with reference to embodiments of FIG. 1 to FIG. 6.

Figure 2:
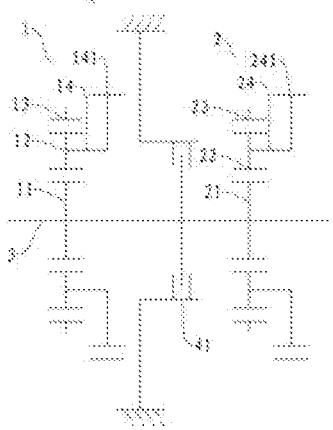
FIG. 2 is a schematic diagram of a part of the power-driven system in FIG. 1, and mainly shows a power coupling device.

Referring to FIG. 1 and with reference to FIG. 2, the power-driven system 1000 in this embodiment of the present disclosure may include a power coupling device 100, a first motor generator 51, a second motor generator 52, a power source 55, and a first braking device 41.

The following first describes in detail the power coupling device 100 with reference to the accompanying drawings.

Referring to FIG. 2, the power coupling device 100 includes a first sun gear 11, a first planet carrier 14, a first ring gear 13, a second sun gear 21, a second planet carrier 24, a second ring gear 23, and a power transmission part 3. The first sun gear 11, the first planet carrier 14, and the first ring gear 13 may form a main part of an epicyclic gearing 1, and the second sun gear 21, the second planet carrier 24, and the second ring gear 23 may form a main part of an epicyclic gearing 2.

A first planet gear 12 is mounted on the first planet carrier 14 and is disposed between the first sun gear 11 and the first ring gear 13, and the first planet gear 12 separately meshes with the first sun gear 11 and the first ring gear 13. The first planet gear 12 may be mounted on the first planet carrier 14 with a planet gear shaft. There may be multiple first planet gears 12, and the first planet gears are distributed around the first sun gear 11 at an even interval. For example, considering the power transmission stability and the manufacturing costs, there may be three first planet gears 12, the three first planet gears are evenly distributed at an outside of the first sun gear 11, and a degree between two adjacent first planet gears 12 is approximately 120 degrees.

A meshing manner between the first planet gear 12 and the first sun gear 11 is outer meshing. A meshing manner between the first planet gear 12 and the first ring gear 13 is inner meshing. That is, teeth are formed on an inner periphery of the first ring gear 13, and the first planet gear 12 meshes with the teeth on the inner periphery of the first ring gear 13. The first planet gear 12 may rotate around an axis of the planet gear shaft, and may also revolve around the first sun gear 11.

Similarly, as shown in FIG. 2, a second planet gear 22 is mounted on the second planet carrier 24 and is disposed between the second sun gear 21 and the second ring gear 23, and the second planet gear 22 separately meshes with the second sun gear 21 and the second ring gear 23. The second planet gear 22 may be mounted on the second planet carrier 24 with a planet gear shaft. There may be multiple second planet gears 22, and the second planet gears are distributed around the second sun gear 21 at an even interval. For example, considering the power transmission stability and the manufacturing costs, there may be three second planet gears 22, the three second planet gears are evenly distributed at an outside of the second sun gear 21, and a degree between two adjacent second planet gears 22 is approximately 120 degrees.

A meshing manner between the second planet gear 22 and the second sun gear 21 is outer meshing. A meshing manner between the second planet gear 22 and the second ring gear 23 is inner meshing. That is, teeth are formed on an inner periphery of the second ring gear 23, and the second planet gear 22 meshes with the teeth on the inner periphery of the second ring gear 23. The second planet gear 22 may rotate around an axis of the planet gear shaft, and may also revolve around the second sun gear 21.

The power transmission part 3 is coaxially linked to the first sun gear 11 and the second sun gear 21. For example, the power transmission part 3, the first sun gear 11, and the second sun gear 21 are coaxially arranged, and can move in a synchronized manner, that is, move in a same direction at a same rotational speed. According to some embodiments of the present disclosure, the power transmission part 3 may be constructed as a power transmission shaft 3, and the first sun gear 11 and the second sun gear 21 are separately coaxially and fixedly disposed on the power transmission shaft 3 and are spaced in an axial direction, for example, are connected to the power transmission shaft 3 with a spline structure.

It should be noted that the "link" may be understood as that multiple parts (for example, two parts) move in a linkage manner. Using an example in which two parts are linked, when one part moves, the other part moves together.

For example, in some embodiments of the present disclosure, that a gear is linked to a shaft may be understood as that when the gear rotates, the linked shaft also rotates, or when the shaft rotates, the linked gear also rotates.

For another example, that a shaft is linked to a shaft may be understood as that when one shaft rotates, the other linked shaft also rotates.

For another example, that a gear is linked to a gear may be understood as that when one gear rotates, the other linked gear also rotates.

Certainly, it should be understood that when one of two linked parts is relatively static, the other part may also be relatively static.

The first motor generator 51 is linked to the first ring gear 13. For example, the first motor generator 51 may be coaxially connected to the first ring gear 13, and the first motor generator 51 may be located at an outside of the first ring gear 13 in a radial direction.

The second motor generator 52 is linked to the second ring gear 23. For example, the second motor generator 52 may be coaxially connected to the second ring gear 23, and the second motor generator 52 may be located at an outside of the second ring gear 13 in a radial direction.

The power source 55 is configured to selectively connect to the power transmission part 3. In other words, when the power source 55 connects to the power transmission part 3, the power source 55 may output generated power to the power transmission part 3, and when the power source 55 does not connect to the power transmission part 3, the power source 55 is disconnected from the power transmission part 3, and there is no linkage movement between the power source 55 and the power transmission part 3.

Therefore, the power-driven system 1000 in this embodiment of the present disclosure has two motors and the power source 55, thereby greatly enriching transmission modes and improving the transmission efficiency of the power-driven system 1000. Specific typical working conditions will be described below in detail with reference to specific embodiments, and details are not described herein.

It should be noted that unless otherwise specified, in the description of the "motor generator" in the present disclosure, the motor generator may be understood as a motor having functions of a generator and an electric motor.

The first braking device 41 is configured to brake the power transmission part 3, and the first braking device 41 may directly brake the power transmission part 3, or may indirectly brake the power transmission part 3. It may be understood that, in specific embodiments of the present disclosure, that one part (for example, a braking device or a brake) brakes another part may be understood in a generalized manner, that is, understood as direct braking or indirect braking.

When the first braking device 41 brakes the power transmission part 3, since the first sun gear 11 and the second sun gear 21 are linked to the power transmission part 3, the first sun gear 11 and the second sun gear 21 are indirectly braked. It may be understood that the first planet carrier 14 and the second planet carrier 24 of the power coupling device 100 may be used as power output ends of the power coupling device 100, so that when the first braking device 41 brakes the power transmission part 3, the first motor generator 51 may output generated power to a corresponding wheel such as a left wheel 73 with the first planet carrier 14, and the second motor generator 52 may output generated power to a corresponding wheel such as a right wheel 74 with the second planet carrier 24.

In this case, the wheels 73 and 74 at two sides are respectively linked to the first motor generator 51 and the second motor generator 52, and rotational speeds of the two wheels can be controlled separately by controlling rotational speeds of the first motor generator 51 and the second motor generator 52, thereby implementing a differential function.

For example, when the vehicle 10000 travels on a flat road and travels along a straight line, the first motor generator 51 and the second motor generator 52 may output power at a same rotational speed. In this way, rotational speeds of corresponding wheels theoretically are the same after respective epicyclic gearings perform speed reduction, thereby ensuring that the vehicle 10000 can travel along a straight line smoothly.

For another example, when the vehicle 10000 travels on an uneven road or turns a corner, a rotational speed difference theoretically may exist between rotational speeds of wheels at two sides. Using a left turn as an example, a turn radius of the left wheel 73 is relatively small and a turn radius of the right wheel 74 is relatively large. To ensure solely rolling movement between the wheels and the ground, the rotational speed of the left wheel 73 needs to be less than the rotational speed of the right wheel 74. In this case, an output rotational speed of the first motor generator 51 may be less than an output rotational speed of the second motor generator 52, and a specific rotational speed difference may be calculated indirectly according to a steering angle of a steering wheel. When a driver rotates the steering wheel counterclockwise (to the left) by a particular angle, a controller of the vehicle 10000 may calculate a turn radius of the vehicle 10000 based on the steering angle, and a relative rotational speed difference between the wheels at the two sides is determined after the turn radius of the vehicle 10000 is determined. Then, the controller may control the first motor generator 51 and the second motor generator 52 to output power at matched rotational speeds, so that the rotational speed difference of the two motor generators can match the rotational speed difference required by the wheels. In this way, the two wheels can obtain expected rotational speeds after the two epicyclic gearings perform speed reduction, thereby implementing solely rolling turning.

The foregoing description is based on an example in which the first motor generator 51 and the second motor generator 52 are used as electric motors. Certainly, the first motor generator 51 and the second motor generator 52 may alternatively work as generators, to recycle braking power of the wheels.

It may be understood that, the epicyclic gearing 1 and the epicyclic gearing 2 may use a same transmission ratio. That is, when the sun gears are used as power input ends and the planet carriers (the first planet carrier 14 and the second planet carrier 24) are used as power output ends, the two epicyclic gearings may use the same transmission ratio. That is, a quantity of teeth of the first sun gear 11 may be the same as a quantity of teeth of the second sun gear 21, a quantity of teeth of the first planet gear 12 may be the same as a quantity of teeth of the second planet gear 22, and a quantity of teeth of the first ring gear 13 may be the same as a quantity of teeth (inner teeth) of the second ring gear 23.

To sum up, in the power-driven system 1000 in this embodiment of the present disclosure, a full electric mode or a braking energy recycling mode of the first motor generator 51 and the second motor generator 52 may be implemented with a braking function of the first braking device 41, and the wheels at the two sides can obtain different torque by separately controlling the output rotational speeds of the first motor generator 51 and the second motor generator 52, to implement a differential function. When the braking function of the first braking device 41 is released, the power source 55 may intervene and output power together with the first motor generator 51 and the second motor generator 52 after power coupling, thereby greatly improving the dynamic performance and passing performance of the power-driven system 1000.

Figure 3:
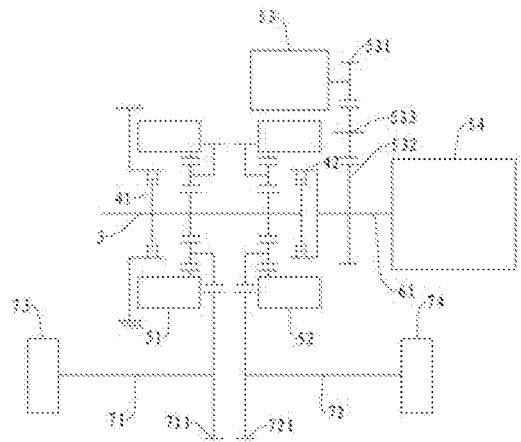
FIG. 3 is a schematic diagram of a power-driven system according to another embodiment of the present disclosure.
Figure 4:
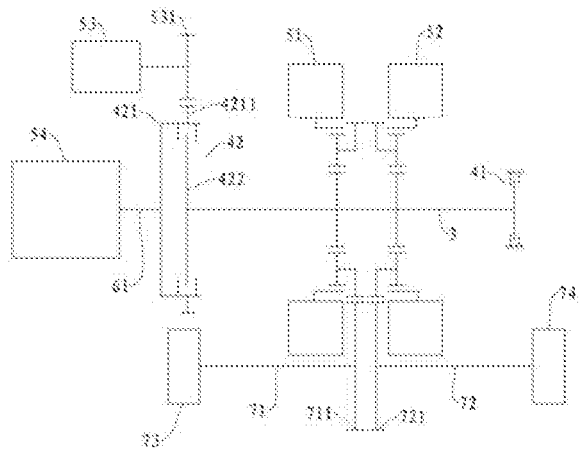
FIG. 4 is a schematic diagram of a power-driven system according to another embodiment of the present disclosure.

According to some embodiments of the present disclosure, a power connection device 42 is disposed between the power source 55 and the power transmission part 3, and the power connection device 42 is used to connect the power transmission part 3 and the power source 55 or disconnect the power transmission part 3 from the power source 55. Referring to FIG. 1, FIG. 3, and FIG. 4, the power connection device 42 is a clutch, and in the embodiments of FIG. 5 and FIG. 6, the power connection device 42 is a synchronizer.

The power connection device 42 is disposed, so that power of the power source 55 can be input to the power transmission part 3 selectively, that is, the power coupling device 100 is used. Therefore, the power of the first motor generator 51 and the power of the second motor generator 52 can be coupled and output.

Figure 5:
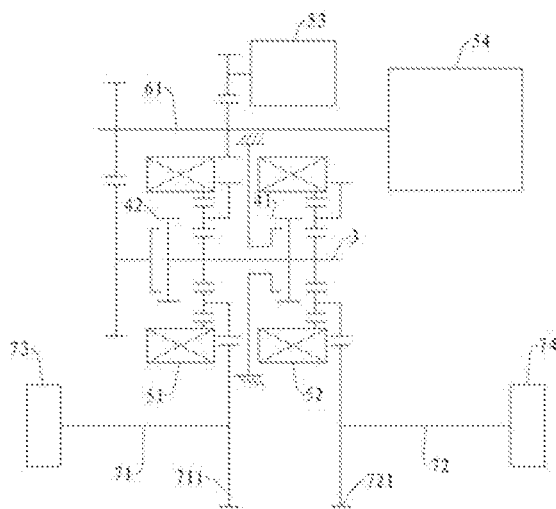
FIG. 5 is a schematic diagram of a power-driven system according to another embodiment of the present disclosure.
Figure 6:
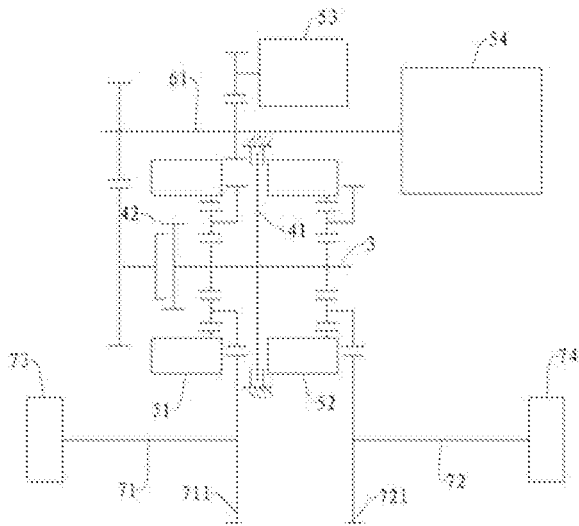
FIG. 6 is a schematic diagram of a power-driven system according to another embodiment of the present disclosure.

The following describes in detail a connection relationship between the power source 55 and the power connection device 100 in the power-driven system 1000 shown in FIG. 1, FIG. 5, and FIG. 6.

In these embodiments, with reference to FIG. 1, the power-driven system 1000 includes an input shaft 61 and an intermediate shaft 62. The input shaft 61 is linked to the intermediate shaft 62, the power source 55 is linked to the input shaft 61, and the intermediate shaft 62 is connected to the power transmission part 3 with the power connection device 42 (the synchronizer or the clutch). In the embodiment of FIG. 1, the clutch, as the power connection device 42, is disposed between the intermediate shaft 62 and the power transmission part 3, and in the embodiments of FIG. 5 and FIG. 6, the synchronizer, as the power connection device 42, is disposed on the power transmission part 3 and is used to connect to (synchronize) the intermediate shaft 62.

In these embodiments, a drive manner between the input shaft 61 and the intermediate shaft 62 is gear drive. In this way, the structure is simple, and the drive is reliable. For example, with reference to FIG. 1, an input shaft fixed gear 611 may be disposed fixedly on the input shaft 61, and an intermediate shaft fixed gear 621 may be disposed fixedly on the intermediate shaft 62. The input shaft fixed gear 611 meshes with the intermediate shaft fixed gear 621, and optionally, a quantity of teeth of the input shaft fixed gear 611 is less than a quantity of teeth of the intermediate shaft fixed gear 621.

In these embodiments, the power source 55 includes an engine 54 and a third motor generator 53, and the engine 54 and the third motor generator 53 are separately linked to the input shaft 61. In some embodiments of the present disclosure, the third motor generator 53 is linked to the input shaft 61 with a gear mechanism. The gear mechanism may include a gear 531 and a gear 532. The gear 531 may be fixedly disposed on a motor shaft of the third motor generator 53, the gear 532 may be fixedly disposed on the input shaft 61, and the gear 532 directly meshes with the gear 532. The engine 54 may be coaxially linked to the input shaft 61. For example, the engine 54 is coaxially connected to the input shaft 61.

The following describes in detail a connection relationship between the power source 55 and the power connection device 100 in the power-driven system 1000 shown in FIG. 3 and FIG. 4.

In these embodiments, the power-driven system 1000 includes the input shaft 61, and the power connection device 42 (for example, the synchronizer or the clutch) is disposed between the input shaft 61 and the power transmission part 3. Compared with the embodiments of FIG. 1, FIG. 5, and FIG. 6, in these embodiments, the intermediate shaft 62 is not used in the power-driven system 1000, so that a structure of power-driven system 1000 is more compact.

In the embodiment of FIG. 3, the power source 55 includes the engine 54 and the third motor generator 53. The engine 54 is coaxially linked to the input shaft 61, for example, the engine 54 is coaxially connected to the input shaft 61. The third motor generator 53 and the input shaft 61 are driven with a gear mechanism. The gear mechanism may include the gear 531, the gear 532, and an idle gear 533. The idle gear 533 is located therebetween, and separately meshes with the gear 531 and the gear 532. The gear 531 may be fixed on the motor shaft of the third motor generator 53, and the gear 532 may be fixed on the input shaft 61. In this embodiment, the engine 54 and the power coupling device 100 are coaxially arranged. That is, a spin axis of a crank shaft of the engine 54 and the power transmission part 3 are coaxially arranged. In this way, a drive chain is shorter, and the transmission efficiency is improved.

In the embodiment of FIG. 4, the power source 55 includes the engine 54 and the third motor generator 53, and the clutch 42 is disposed between the input shaft 61 and the power transmission part 3. The clutch 42 includes a first connection part 421 and a second connection part 422. The engine 54 may be connected to the first connection part 421 with the input shaft 61, the power transmission part 3 may be connected to the second connection part 422, and the third motor generator 53 may be linked to the first connection part 421. For example, outer teeth 4211 may be disposed on an outer periphery of the first connection part 421, and the third motor generator 53 may be linked to the outer teeth 4211. For example, the gear 531 may be fixedly disposed on the motor shaft of the third motor generator 53, and the gear 531 meshes with the outer teeth 4211.

In the embodiments of FIG. 1 to FIG. 6, the power coupling device 100 is connected behind the power connection device 42, and the power source 55 including the engine 54 and the third motor generator 53 is connected in front of the power connection device 42, so that different working conditions can be implemented with different states (connection/disconnection) of the power connection device 42. For example, when the power connection device 42 is in a disconnected state, the engine 54 may drive the third motor generator 53 to generate electricity, and power of the engine 54 is directly input to the third motor generator 53 with the input shaft 61. In this case, wheels are disconnected from the engine 54 with the power connection device 42 in a disconnected state, thereby greatly shortening a power transmission path, and improving the charging efficiency. In this case, if the vehicle is in a parking state, a stationary power generation function is implemented, or if the first motor generator 51 and the second motor generator 52 are used as electric motors to drive the wheels, a driving power generation function is implemented. When the power connection device 42 is in a connected state, the engine 54 and the third motor generator can implement hybrid power. In this case, the three motor generators, especially the third motor generator 53, may adjust a rotational speed of the engine 54, to compensate for torque of the engine 54, so that the engine 54 is in an optimal working range, thereby improving fuel economy. In addition, the first motor generator 51 and the second motor generator 52 may change rotational speeds frequently and adaptively, to implement instantaneous adjustment on rotational speeds of the wheels, and improve the dynamic performance, stability, and safety of the vehicle.

The descriptions are merely examples of some typical working conditions in the embodiments of the FIG. 1 to FIG. 6, and detailed descriptions of the working conditions are provided below with reference to specific embodiments.

For the first braking device 41, in some embodiments, the first braking device 41 may be configured to directly brake the power transmission part 3. That is, in these embodiments, the first braking device 41 directly brakes the power transmission part 3 such as the power transmission shaft 3, but does not indirectly brake the power transmission part with another intermediate part. Therefore, the braking efficiency is relatively high. Optionally, in the embodiments of FIG. 1 to FIG. 4 and FIG. 6, the first braking device 41 may be a brake, and in the embodiment of FIG. 5, the first braking device 41 may be a synchronizer.

In an implementation, as shown in FIG. 1, FIG. 5, and FIG. 6, the first braking device 41 may be located between the first sun gear 11 and the second sun gear 21. In this way, the structure of the power-driven system 1000 is more compact. In addition, in this arrangement manner, the first braking device 41 is located at an intermediate location, so that braking force is distributed at an intermediate location of the power transmission shaft 3 as far as possible, and the braking effect is more stable.

In another implementation, as shown in FIG. 3 and FIG. 4, the first braking device 41 and the power connection device 42 are respectively located at two sides of the first sun gear 11 and the second sun gear 21. In this way, the first braking device 41, the epicyclic gearing 1, the epicyclic gearing 2, and the power connection device 42 are arranged on the power transmission part 3 along an axial direction, so that a structure of the power coupling device 100 is more compact, and a volume is smaller.

Since the first planet carrier 14 and the second planet carrier 24 may be used as power output ends of the power-driven system 1000, gears may be disposed on the planet carriers, so that the planet carriers output power conveniently. As shown in FIG. 2, in an implementation, a first planet carrier output gear 141 is coaxially disposed on the first planet carrier 14, and a second planet carrier output gear 241 is coaxially disposed on the second planet carrier 24. Still further, the first planet carrier output gear 141 is located at an outside of the first planet carrier 14 in a radial direction, and the second planet carrier output gear 241 is located at an outside of the second planet carrier 24 in a radial direction. Since radial sizes of the first planet carrier 14 and the second planet carrier 24 are relatively large, and the two output gears 141 and 241 are respectively disposed at the outside of the respective planet carriers in a radial direction, the two output gears 141 and 241 have larger turn radii, to cooperate with axle shafts 71 and 72 of the vehicle 10000 or axle shaft gears 711 and 721 on the axle shafts 71 and 72 for transmission, thereby improving the transmission reliability.

Referring to FIG. 1 and with reference to the embodiment of FIG. 2, the power coupling device 100 includes two epicyclic gearings 1 and 2, and the first motor generator 51 (a rotor) and the second motor generator 52 (a rotor) are respectively connected to an outside of the first ring gear 13 and an outside of the second ring gear 23 in a radial direction. Specifically, the rotor of the first motor generator 51 is coaxially connected to the outside of the first ring gear 13 in the radial direction, a stator is located at an outside of the rotor, and a housing is located at an outside of the stator. Similarly, the rotor of the second motor generator 52 is coaxially connected to the outside of the second ring gear 23 in the radial direction, a stator is located at an outside of the rotor, and a housing is located at an outside of the stator.

That is, the housing of the first motor generator 51 and the housing of the second motor generator 52 may be located at an outside of the power coupling device 100 (for example, the outermost) in a radial direction. Therefore, in a preferable implementation, the housing of the first motor generator 51 and the housing of the second motor generator 52 may form an integrated structure, and cover the two epicyclic gearings 1 and 2, to form a sharing shell. That is, the sharing shell may be used as a large shell of the power coupling device 100, and the two epicyclic gearings 1 and 2, and the two motors 51 and 52 may be accommodated inside the sharing shell, thereby reducing a quantity of parts. Therefore, the structure of the power-driven system 1000 is more compact, and the volume is smaller, facilitating manufacturing, greatly reducing the manufacturing costs, and implementing a highly-integrated design of a product. Further, efficient module production is implemented for the power-driven system 1000, and the efficiency is greatly improved in manufacturing and assembly.

Certainly, in a similar variant example, the power connection device 42, the first sun gear 11, the first planet carrier 14, the first planet gear 12, and the first ring gear 13 may be accommodated inside the first motor generator 51, that is, inside the housing of the first motor generator 51, and the first braking device 41, the second sun gear 21, the second planet gear 22, the second planet carrier 24, and the second ring gear 23 may be accommodated inside the second motor generator 52, for example, inside the housing of the second motor generator 52.

Therefore, the highly-integrated design of the product can be implemented, efficient module production is implemented for the power-driven system 1000, the efficiency is greatly improved in manufacturing and assembly, and the costs are reduced efficiently.

The following describes in detail a detailed construction and typical working conditions of the power-driven system 1000 in the embodiment of FIG. 1 with reference to FIG. 1.

As shown in FIG. 1 (with reference to FIG. 2), the epicyclic gearing 1 and the epicyclic gearing 2 are coaxially arranged.

The epicyclic gearing 1 includes the first sun gear 11, the first planet gear 12, the first planet carrier 14, and the first ring gear 13. The first sun gear 11 is located at an intermediate location, the first planet gear 12 separately meshes with the first sun gear 11 and the first ring gear 13, the first planet gear 12 is mounted on the first planet carrier 14, the first planet carrier output gear 141 is coaxially fixed on the first planet carrier 14, the first planet carrier output gear 141 meshes with the axle shaft gear 711 on the left axle shaft 71, and an outside of the left axle shaft 71 is connected to the left wheel 73.

The epicyclic gearing 2 includes the second sun gear 21, the second planet gear 22, the second planet carrier 24, and the second ring gear 23. The second sun gear 21 is located at an intermediate location, the second planet gear 22 separately meshes with the second sun gear 21 and the second ring gear 23, the second planet gear 22 is mounted on the second planet carrier 24, the second planet carrier output gear 241 is coaxially fixed on the second planet carrier 24, the second planet carrier output gear 241 meshes with the axle shaft gear 721 on the right axle shaft 72, and an outside of the right axle shaft 72 is connected to the right wheel 74.

A quantity of teeth of each kinematic pair of the epicyclic gearing 1 may be the same as a quantity of teeth of a corresponding kinematic pair of the epicyclic gearing 2, so that the epicyclic gearing 1 and the epicyclic gearing 2 have a same transmission ratio when transmitting power according to a same transmission path.

The first sun gear 11 and the second sun gear 21 are coaxially fixed on the power transmission shaft 3. The power transmission shaft 3 is a straight shaft, and may be of a hollow structure or may be of a solid structure. The first braking device 41 is located between the first sun gear 11 and the second sun gear 21, and is used to directly brake the power transmission shaft 3. The first braking device 41 may be a brake.

The first motor generator 51 is coaxially fixed at the outside of the first ring gear 13 in the radial direction, and the second motor generator 52 is coaxially fixed at the outside of the second ring gear 23 in the radial direction.

The engine 54 is coaxially connected to the input shaft 61, the intermediate shaft 62 and the power transmission shaft 3 are coaxially arranged and the clutch 42 is disposed therebetween, and the input shaft fixed gear 611 fixed on the input shaft 61 meshes with the intermediate shaft fixed gear 621 fixed on the intermediate shaft 62.

The gear 531 is fixedly disposed on the motor shaft of the third motor generator 53, and the gear 531 meshes with the gear 532 fixed on the input shaft 61.

As can be learned from the structure in the embodiment of FIG. 1, in the power-driven system 1000, a conventional mechanical differential is not used, power of the engine 54 and the third motor generator 53 can be selectively input to the power transmission shaft 3, and the power transmission shaft 3 can be locked selectively with the first braking device 41 to brake the sun gears. In this case, the ring gears of the two epicyclic gearings respectively connect to the first motor generator 51 and the second motor generator 52 independently, and finally, the planet carriers of the two epicyclic gearings are used as the power output ends to output power. That is, the following multiple drive working conditions can be implemented with the clutch 42, the first braking device 41, and different working modes and rotational speed adjustment of the three motor generators and the engine.

Full Electric Working Condition:

The engine 54 and the third motor generator 53 do not work, and the clutch 42 is in a disconnected state. The first braking device 41 brakes the power transmission shaft 3, so that the first sun gear 11 and the second sun gear 21 are indirectly braked. The first motor generator 51 and the second motor generator 52 work independently to drive corresponding wheels.

Hybrid Working Condition:

The clutch 42 is in a connected state, and the first braking device 41 is in a disconnected state. The power output by the engine 54 is output to the power transmission shaft 3 with the clutch 42, and in this case, the third motor generator 53 works as a generator. That is, a part of power from the engine 54 is used for electricity generation, and obtained electricity power may be provided for the first motor generator 51 and the second motor generator 52. That is, in this case, the first motor generator 51 and the second motor generator 52 work as electric motors, and generated power and the power of the engine are output from respective planet carriers after being coupled.

Alternatively, in this case, the third motor generator 53 may also be used as an electric motor to output power, supplement torque of the engine 54, and perform adaptive speed adjustment for the engine 54. In this case, the first motor generator 51 and the second motor generator 52 work as electric motors, and power of the electric motors are respectively output to respective wheels after being coupled on the first planet carrier 14 and the second planet carrier 24.

Since the three motor generators and the engine 54 are in a rotational speed coupling relationship, when a vehicle speed needs to change constantly within a short time, the speed can be adjusted with the motors. For example, speed adjustment is performed with the third motor generator 53 working as an electric motor, or speed adjustment is performed with the first motor generator 51 and the second motor generator 52, or speed adjustment can be performed with the three motors at the same time, thereby ensuring that the engine 54 can always drive working at a relatively efficient rotational speed, and implementing preferable fuel economy.

Range-Extended Working Condition:

In a full electric working condition, when a battery is out of power, the clutch 42 is still in the disconnected state, the engine 54 is started, and the engine 54 outputs power to drive the third motor generator 53 to generate electricity, and supplement necessary electricity power for the first motor generator 51 and the second motor generator 52. This working condition may also be referred to as driving power generation.

Stationary Power Generation working Condition:

When the vehicle is in a parking state (for example, the wheels 73 and 74 are braked with a parking brake system), the clutch 42 is disconnected, and the first braking device 41 releases the power transmission part 3. The engine 54 outputs power to drive the third motor generator 53 to generate electricity. In this case, the first motor generator 51 and the second motor generator 52 do not work.

FIG. 3 shows an implementation of another power-driven system 1000. Compared with the embodiment of FIG. 1, in the embodiment of FIG. 3, the intermediate shaft 62 is not used in the power-driven system 1000, the clutch 42 and the first braking device 41 are respectively arranged at the two sides of the first sun gear 11 and the second sun gear 21, and constructions of the other parts and typical working conditions are basically the same as those in the embodiment of FIG. 1, and details are not described herein again.

FIG. 4 shows an implementation of another power-driven system 1000. Compared with the embodiment of FIG. 3, in the power-driven system 1000 in the embodiment of FIG. 4, the third motor generator 53 is connected to the first connection part 421 of the clutch 42 with the gear 531 and the outer teeth 4211, and constructions of the other parts and typical working conditions are basically the same as those in the embodiment of FIG. 3, and details are not described herein again.

FIG. 5 shows an implementation of another power-driven system 1000. Compared with the embodiment of FIG. 1, in the power-driven system 1000 in the embodiment of FIG. 5, the power connection device 42 is a synchronizer, the first braking device 41 is also replaced with a synchronizer, and constructions of the other parts and typical working conditions are basically the same as those in the embodiment of FIG. 1, and details are not described herein again.

FIG. 6 shows an implementation of another power-driven system 1000. Compared with the embodiment of FIG. 1, in the power-driven system 1000 in the embodiment of FIG. 6, the power connection device 42 is a synchronizer, and constructions of the other parts and typical working conditions are basically the same as those in the embodiment of FIG. 1, and details are not described herein again.

To sum up, in the power-driven system 1000 in this embodiment of the present disclosure, the first motor generator 51 and the second motor generator 52 are used to implement speed adjustment and torque conversion, and the two epicyclic gearings perform power coupling, to enable the power-driven system 1000 to be simplest and most compact. In the series-parallel power-driven system 1000, not only the first motor generator 51 and the second motor generator 52 can control wheels at respective sides independently, but also it can be ensured as far as possible that the engine 54 works in a rotational speed range with high fuel economy. In addition, since the first motor generator 51 and the second motor generator 52 can control the corresponding wheels independently, the active safety and mobility of the system of the vehicle 10000 are greatly improved, and the operability and driving experience of the system are greatly improved. In addition, the system has a function that the third motor generator 53 supplements torque for the engine 54 and generates electricity, power sources can satisfy a speed ratio requirement scientifically and appropriately, and there are a relatively small quantity of mechanical control elements such as a gear shift element, so that the structure is simple and compact and the space utilization is extremely high.

It may be understood that the power-driven system 1000 may be applied to front engine front drive or rear engine rear drive of the vehicle, and is preferably applied to front engine front drive of the vehicle. When the foregoing power-driven system 1000 is applied to front engine front drive, a driving system 100*a* shown in the following FIG. 7 to FIG. 17 may be applied to rear engine rear drive, so as to drive the vehicle together.

In short, the power coupling device 100 in the foregoing power-driven system 1000 may drive a pair of front wheels of the vehicle, and the driving system 100*a* shown in FIG. 7 to FIG. 17 may drive a pair of rear wheels of the vehicle. However, the present disclosure is not limited thereto. For example, the power coupling device 100 may drive the pair of rear wheels of a vehicle, and the driving system 100*a* shown in FIG. 7 to FIG. 17 may drive the pair of front wheels.

Figure 7:
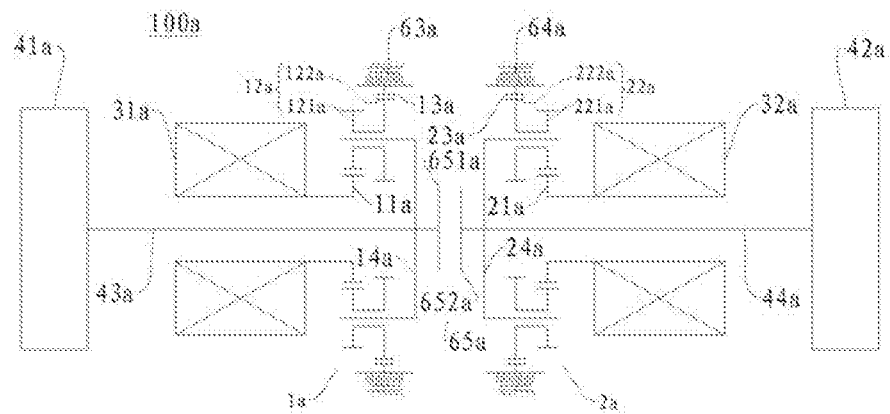
FIG. 7 to FIG. 17 are schematic diagrams of parts of a power-driven system according to an embodiment of the present disclosure, and the shown parts may be applied to rear drive of a vehicle.
Figure 8:
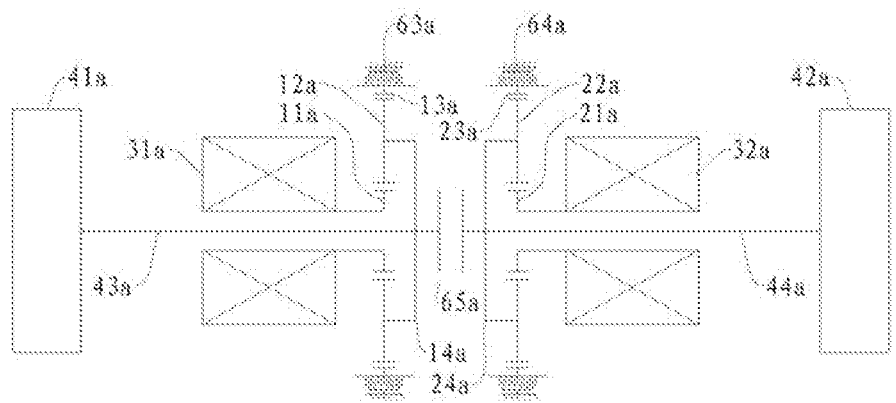
Figure 9:
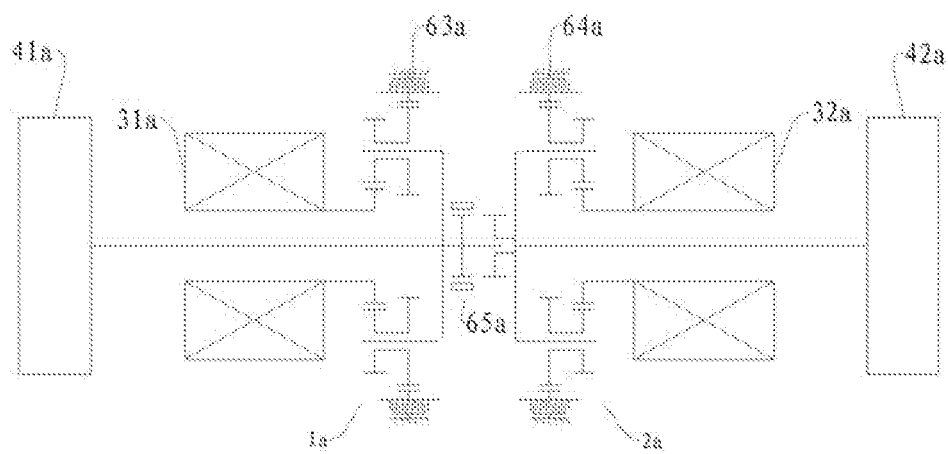

The following first describes in detail the driving system 100*a* shown in FIG. 7 to FIG. 9 with reference to specific embodiments.

As shown in FIG. 7 to FIG. 9, the driving system 100*a* in this embodiment of the present disclosure may include a first epicyclic gearing 1*a*, a second epicyclic gearing 2*a*, a fourth motor generator 31*a*, a fifth motor generator 32*a*, a second braking device 63*a*, a third braking device 64*a*, and a power connection device 65*a*.

As shown in FIG. 7 to FIG. 9, the first epicyclic gearing 1*a* may be a one-row epicyclic gearing, and the first epicyclic gearing 1*a* may include a third sun gear 11*a*, a third planet gear 12*a*, a third planet carrier 14*a*, and a third ring gear 13*a*. The third planet gear 12*a* is mounted on the third planet carrier 14*a* and is disposed between the third sun gear 11*a* and the third ring gear 13*a*, and the third planet gear 12*a* separately meshes with the third sun gear 11*a* and the third ring gear 13*a*. The third planet gear 12*a* may be mounted on the third planet carrier 14*a* with a planet gear shaft, there may be multiple third planet gears 12*a*, and the third planet gears 12*a* are distributed around the third sun gear 11*a* at an even interval. For example, considering the power transmission stability and the manufacturing costs, there may be three third planet gears 12*a*, the three third planet gears are evenly distributed at an outside of the third sun gear 11*a*, and an angle between two adjacent third planet gears 12*a* is approximately 120 degrees.

A meshing manner between the third planet gear 12*a* and the third sun gear 11*a* is outer meshing. A meshing manner between the third planet gear 12*a* and the third ring gear 13*a* is inner meshing. That is, teeth are formed on an inner periphery of the third ring gear 13*a*, and the third planet gear 12*a* meshes with the teeth on the inner periphery of the third ring gear 13*a*. The third planet gear 12*a* may rotate around an axis of the planet gear shaft, and may also revolve around the sun gear.

Similarly, as shown in FIG. 7 to FIG. 9, the second epicyclic gearing 2*a* may be a one-row epicyclic gearing, and the second epicyclic gearing 2*a* may include a fourth sun gear 21*a*, a fourth planet gear 22*a*, a fourth planet carrier 24*a*, and a fourth ring gear 23*a*. The fourth planet gear 22*a* is mounted on the fourth planet carrier 24*a* and is disposed between the fourth sun gear 21*a* and the fourth ring gear 23*a*, and the fourth planet gear 22*a* separately meshes with the fourth sun gear 21*a* and the fourth ring gear 23*a*. The fourth planet gear 22*a* may be mounted on the fourth planet carrier 24*a* with a planet gear shaft, there may be multiple fourth planet gears 22*a*, and the fourth planet gears 22*a* are distributed around the fourth sun gear 21*a* at an even interval. For example, considering the power transmission stability and the manufacturing costs, there may be three fourth planet gears 22*a*, the three fourth planet gears are evenly distributed at an outside of the fourth sun gear 21*a*, and an angle between two adjacent fourth planet gears 12*a* is approximately 120 degrees.

A meshing manner between the fourth planet gear 22*a* and the fourth sun gear 21*a* is outer meshing. A meshing manner between the fourth planet gear 22*a* and the fourth ring gear 23*a* is inner meshing. That is, teeth are formed on an inner periphery of the fourth ring gear 23*a*, and the fourth planet gear 22*a* meshes with the teeth on the inner periphery of the fourth ring gear 23*a*. The fourth planet gear 22*a* may rotate around an axis of the planet gear shaft, and may also revolve around the sun gear.

In some implementations of the present disclosure, the third planet gear 12*a* may include a first gear part 121*a* and a second gear part 122*a* that are coaxially arranged and rotate synchronously, the first gear part 121*a* meshes with the third sun gear 11*a*, and the second gear part 122*a* meshes with the third ring gear 13*a*. The first gear part 121*a* and the second gear part 122*a* may be fixedly connected with one shaft. The first gear part 121*a* may be a small tooth part and the second gear part 122*a* may be a large tooth part. That is, a quantity of teeth of the first gear part 121*a* is less than a quantity of teeth of the second gear part 122*a*. Therefore, when power output by the fourth motor generator 31*a* is transmitted with the first gear part 121*a* and the second gear part 122*a*, the first gear part 121*a* and the second gear part 122*a* form a speed reduction mechanism, implementing an effect of speed reduction and torque increase for the fourth motor generator 31*a*. Certainly, optionally, the first gear part 121*a* may be a large tooth part and the second gear part 122*a* may be a small tooth part.

Similarly, the fourth planet gear 22*a* may include a third gear part 221*a* and a fourth gear part 222*a* that are coaxially arranged and rotate synchronously, the third gear part 221*a* meshes with the fourth sun gear 21*a*, and the fourth gear part 222*a* meshes with the fourth ring gear 23*a*. The third gear part 221*a* and the fourth gear part 222*a* may be fixedly connected with one shaft. The third gear part 221*a* may be a small tooth part and the fourth gear part 222*a* may be a large tooth part. That is, a quantity of teeth of the third gear part 221*a* is less than a quantity of teeth of the fourth gear part 222*a*. Therefore, when power output by the fifth motor generator 32*a* is transmitted with the third gear part 221*a* and the fourth gear part 222*a*, the third gear part 221*a* and the fourth gear part 222*a* form a speed reduction mechanism, implementing an effect of speed reduction and torque increase for the fifth motor generator 32*a*. Certainly, optionally, the third gear part 221*a* may be a large tooth part and the fourth gear part 222*a* may be a small tooth part.

In a preferable embodiment, the first gear part 121*a* and the second gear part 122*a* may form an integrated structure, so as to form a duplicate gear. Similarly, the third gear part 221*a* and the fourth gear part 222*a* may also form an integrated structure, so as to form a duplicate gear. Therefore, the structure is simple and compact, and the transmission is reliable.

The third planet carrier 14*a* and the fourth planet carrier 24*a* may be used as power output ends of the driving system 100*a*. For example, the third planet carrier 14*a* and the fourth planet carrier 24a may output power of a power source such as the fourth motor generator 31a and/or the fifth motor generator 32a to, for example, wheels 41a and 42a. In some embodiments of the present disclosure, when the power coupling device 100 drives a first pair of wheels, the third planet carrier 14a and the fourth planet carrier 24a may be respectively linked to the two wheels 41a and 42a in a second pair of wheels, so that the third planet carrier 14a and the fourth planet carrier 24a can output power of the driving system 100a to the second pair of wheels 41a and 42a, and the vehicle 10000 can travel normally. The first pair of wheels is one of a pair of front wheels and a pair of rear wheels, and the second pair of wheels is the other one of the pair of front wheels and the pair of rear wheels.

As shown in FIG. 7 to FIG. 9, the fourth motor generator 31a is linked to the third sun gear 11a. For example, a rotor of the fourth motor generator 31a may be coaxially connected to the third sun gear 11a. However, this is not limited thereto.

It should be noted that the "link" may be understood as that multiple parts (for example, two parts) move in a linkage manner. Using an example in which two parts are linked, when one part moves, the other part moves together.

For example, in some embodiments of the present disclosure, that a gear is linked to a shaft may be understood as that when the gear rotates, the linked shaft also rotates, or when the shaft rotates, the linked gear also rotates.

For another example, that a shaft is linked to a shaft may be understood as that when one shaft rotates, the other linked shaft also rotates.

For another example, that a gear is linked to a gear may be understood as that when one gear rotates, the other linked gear also rotates.

Certainly, it should be understood that when one of two linked parts is relatively static, the other part may also be relatively static.

Unless otherwise specified, the descriptions about "linkage" below in the present disclosure should be understood in this way.

Similarly, the fifth motor generator 32a is linked to the fourth sun gear 21a. For example, the rotor of the fifth motor generator 32a may be coaxially connected to the fourth sun gear 21a. However, this is not limited thereto.

It should be noted that unless otherwise specified, in the description of the "motor generator" in the present disclosure, the motor generator may be understood as a motor having functions of a generator and an electric motor.

The second braking device 63a is configured to brake the third ring gear 13a, and the third braking device 64a is configured to brake the fourth ring gear 23a. In some embodiments of the present disclosure, the second braking device 63a and the third braking device 64a may be brakes. However, this is not limited thereto.

The driving system 100a may include a first power output shaft 43a and a second power output shaft 44a. The first power output shaft 43a is disposed between the third planet carrier 14a and one wheel 41a in the second pair of wheels of the vehicle 10000, the second power output shaft 44a is disposed between the fourth planet carrier 24a and the other wheel 42a in the second pair of wheels, and the second pair of wheels may be a pair of front wheels, or may be a pair of rear wheels.

As shown in FIG. 7 to FIG. 9, the power connection device 65a is configured to connect the first power output shaft 43a and the second power output shaft 44a, so that the first power output shaft 43a and the second power output shaft 44a are in rigid connection, and further, the first power output shaft 43a and the second power output shaft 44a can rotate in a same direction at a same speed. That is, when the power connection device 65a is in a connected state, the first power output shaft 43a and the second power output shaft 44a remain in a synchronized state, and when the power connection device 65a is in a disconnected state, the first power output shaft 43a and the second power output shaft 44a can perform differential rotation. That is, the first power output shaft 43a and the second power output shaft 44a may rotate at different rotational speeds (or may rotate at a same rotational speed).

It should be noted that that the power connection device 65a is used to connect the first power output shaft 43a and the second power output shaft 44a should be understood in a generalized way. For example, the power connection device 65a may directly connect the first power output shaft 43a and the second power output shaft 44a or disconnect the first power output shaft 43a from the second power output shaft 44a. Certainly, optionally, the power connection device 65a may connect or disconnect two other components to indirectly implement connection and disconnection between the first power output shaft 43a and the second power output shaft 44a, and the two components may be components connected to the first power output shaft 43a and the second power output shaft 44a. For example, the two components are the third planet carrier 14a and the fourth planet carrier 24a.

When the vehicle having the driving system 100a in this embodiment of the present disclosure, for example, the vehicle 10000, travels on a flat road and travels along a straight line, the second braking device 63a and the third braking device 64a may respectively drive the third ring gear 13a and the fourth ring gear 23a, and the fourth motor generator 31a and the fifth motor generator 32a may output power at a same rotational speed. In this way, rotational speeds of corresponding wheels theoretically are the same after respective epicyclic gearings perform speed reduction, thereby ensuring that the vehicle 10000 can travel along a straight line smoothly.

For another example, when the vehicle 10000 travels on an uneven road or turns a corner, the second braking device 63a and the third braking device 64a may respectively brake the third ring gear 13a and the fourth ring gear 23a. In this case, a rotational speed difference theoretically may exist between rotational speeds of wheels at two sides. Using a left turn as an example, a turn radius of the left wheel is relatively small and a turn radius of the right wheel is relatively large. To ensure solely rolling movement between the wheels and the ground, the rotational speed of the left wheel needs to be less than the rotational speed of the right wheel. In this case, an output rotational speed of the fourth motor generator 31a may be less than an output rotational speed of the fifth motor generator 32a, and a specific rotational speed difference may be calculated indirectly according to a steering angle of a steering wheel. For example, a driver rotates the steering wheel counterclockwise (to the left) by a particular angle, a controller of the vehicle 10000 may calculate a turn radius of the vehicle 10000 based on the steering angle, and after the turn radius of the vehicle 10000 is determined, a relative rotational speed difference between the wheels at the two sides can be determined. In this case, the controller may control the fourth motor generator 31a and the fifth motor generator 32a to output power at corresponding rotational speeds, so that the rotational speed difference of the two motor generators can match the rotational speed difference required by the wheels. In this way, the two wheels can obtain expected rotational speeds after the two epicyclic gearings perform speed reduction, so that the vehicle can turn a corner with solely rolling movement.

The foregoing description is based on an example in which the fourth motor generator 31a and the fifth motor generator 32a are used as electric motors. Certainly, the fourth motor generator 31a and the fifth motor generator 32a may alternatively work as generators. In this case, similarly, the second braking device 63a and the third braking device 64a may respectively brake the third ring gear 13a and the fourth ring gear 23a, and the fourth motor generator 31a and the fifth motor generator 32a may work as generators, to recycle braking energy.

Certainly, it may be understood that the first epicyclic gearing 1a and the second epicyclic gearing 2a may use a same transmission ratio. For example, the sun gears are used as power input ends and the planet carriers are used as power output ends. In this case, the two epicyclic gearings may use a same transmission ratio. That is, a quantity of teeth of the third sun gear 11a may be the same as a quantity of teeth of the fourth sun gear 21a, a quantity of teeth of the third planet gear 12a may be the same as a quantity of teeth of the fourth planet gear 22a, and a quantity of teeth of the third ring gear 13a may be the same as a quantity of teeth (inner teeth) of the fourth ring gear 23a.

The vehicle 10000 sometimes may travel in a poor road condition, for example, travel on a road such as a muddy or mollic gravel road or a sandy road. Using a muddy road as an example, when the vehicle 10000 travels on a muddy road, the vehicle 10000 may sink into the mud, leading to empty running. That is, the vehicle 10000 skids (a skid phenomenon and a reason of the skid phenomenon are known by a person skilled in the art). For a conventional differential having a self-locking function, when the wheel skids, only the differential needs to be controlled to be self-locked, so that the capability of the vehicle 10000 of getting rid of this situation can be improved at least to some extent.

Although the driving system 100a in this embodiment of the present disclosure has a differential function, a structure is greatly different from that of a conventional differential, and therefore, a conventional differential self-locking structure cannot be used. Therefore, to improve the passing performance of the vehicle 10000, and improve the capability of the vehicle 10000 of adapting to a poorer road condition, the driving system 100a in some embodiments of the present disclosure can further implement a self-locking function under the premise of implementing a differential function.

According to some embodiments of the present disclosure, as shown in FIG. 7 to FIG. 9, when a wheel at one side of the vehicle skids, the power connection device 65a connects the first power output shaft 43a and the second power output shaft 44a, and the second braking device 63a and the third braking device 64a respectively brake the third ring gear 13a and the fourth ring gear 23a. Therefore, the fourth motor generator 31a and the fifth motor generator 32a may output generated power from a wheel that does not skid, to improve a skid phenomenon of the wheel, and improve the passing performance of the vehicle.

To sum up, in the driving system 100a in this embodiment of the present disclosure, a full electric mode or a braking energy recycling mode of the fourth motor generator 31a and the fifth motor generator 32a may be implemented with braking functions of the second braking device 63a and the third braking device 64a, and wheels at two sides can obtain different torque by separately controlling output rotational speeds of the fourth motor generator 31a and the fifth motor generator 32a, to implement a differential function. In addition, the driving system 100a in this embodiment of the present disclosure has a small quantity of parts and a compact and simple structure, and occupies a small volume, thereby facilitating arrangement.

In addition, in the driving system 100a in this embodiment of the present disclosure, a mechanical self-locking differential structure in a conventional power transmission system may not be disposed, and a conventional mechanical self-locking differential function can be implemented with a synchronization function of the power connection device 65a. Therefore, the power transmission system 100a in this embodiment of the present disclosure has a more compact structure and lower costs.

In some embodiments of the present disclosure, the power connection device 65a may be a clutch. The clutch includes a driving part 651a and a driven part 652a that may be connected and disconnected, the driving part 651a is connected to the first power output shaft 43a, and the driven part 652a is connected to the second power output shaft 44a.

Certainly, the present disclosure is not limited thereto. In some other embodiments, the power connection device 65a may be a synchronizer, and the synchronizer is disposed on one of the first power output shaft 43a and the second power output shaft 44a and is used to connect to the other one.

In some embodiments of the present disclosure, the fourth motor generator 31a and the third sun gear 11a may be coaxially freely sleeved on the first power output shaft 43a, and the fifth motor generator 32a and the fourth sun gear 21a may be coaxially freely sleeved on the second power output shaft 44a, so that the structure of the driving system 100a is more compact.

In addition, the fourth motor generator 31a and the fifth motor generator 32a may be disposed in a bilaterally symmetric manner, for example, are arranged symmetrically around the power connection device 65a. The first epicyclic gearing 1a and the second epicyclic gearing 2a may be disposed in a bilaterally symmetric manner, for example, are arranged symmetrically around the power connection device 65a. In addition, the fourth motor generator 31a and the fifth motor generator 32a may be respectively located at an outside of the first epicyclic gearing 1a and an outside of the second epicyclic gearing 2a. That is, using FIG. 7 as an example, the fourth motor generator 31a is located at the outside, that is, the left side, of the first epicyclic gearing 1a, and the fifth motor generator 32a is located at the outside, that is, the right side, of the second epicyclic gearing 2a.

In some embodiments of the present disclosure, the first power output shaft 43a and the second power output shaft 44a may be axle shafts. For example, the first power output shaft 43a may be a left axle shaft, and the second power output shaft 44a may be a right axle shaft.

The following describes a construction, a connection relationship, and typical working conditions of the driving system 100a in the embodiment of FIG. 7 with reference to the accompanying drawings.

As shown in FIG. 7, the driving system 100a shown in this embodiment mainly includes two one-row epicyclic gearings 1a and 2a, two motor generators 31a and 32a, two braking devices 63a and 64a, the power connection device 65a, and the like.

Specifically, the first epicyclic gearing 1a at the left side includes the third sun gear 11a, the third planet gear 12a, and the third ring gear 13a. The third sun gear 11a is freely sleeved on the first power output shaft 43a, the third sun gear 11a is connected to the fourth motor generator 31a, and the fourth motor generator 31a is freely sleeved on the first power output shaft 43a. The third planet gear 12a is a duplicate gear, and is mounted on the third planet carrier 14a, and the third planet gear 12a separately meshes with the third sun gear 11a and the third ring gear 13a.

Similarly, the second epicyclic gearing 2a at the right side includes the fourth sun gear 21a, the fourth planet gear 22a, and the fourth ring gear 23a. The fourth sun gear 21a is freely sleeved on the second power output shaft 44a, the fourth sun gear 21a is connected to the fifth motor generator 32a, and the fifth motor generator 32a is freely sleeved on the second power output shaft 44a. The fourth planet gear 22a is a duplicate gear, and is mounted on the fourth planet carrier 24a, and the fourth planet gear 22a separately meshes with the fourth sun gear 21a and the fourth ring gear 23a.

The second braking device 63a is used to brake the third ring gear 13a, the third braking device 64a is used to brake the fourth ring gear 23a, and the power connection device 65a is disposed between the first epicyclic gearing 1a and the second epicyclic gearing 2a and is used to selectively connect the first power output shaft 43a and the second power output shaft 44a.

The first power output shaft 43a is connected to the left wheel 41a and the third planet carrier 14a, and the second power output shaft 44a is connected to the right wheel 42a and the fourth planet carrier 24a.

The following describes typical working conditions of the driving system 100a in the embodiment of FIG. 7.

Full electric working condition (relying on the fourth motor generator 31a and the fifth motor generator 32a):

The second braking device 63a brakes the third ring gear 13a, the third braking device 64a brakes the fourth ring gear 23a, and the power connection device 65a is in a disconnected state. The fourth motor generator 31a and the fifth motor generator 32a may separately work as an electric motor. Therefore, power generated by the fourth motor generator 31a is transmitted to the left wheel 41a with the third sun gear 11a, the third planet gear 12a, the third planet carrier 14a, and the first power output shaft 43a, and a rotational speed of the fourth motor generator 31a is positively related to a rotational speed of the left wheel 41a. Power generated by the fifth motor generator 32a is transmitted to the right wheel 42a with the fourth sun gear 21a, the fourth planet gear 22a, the fourth planet carrier 24a, and the second power output shaft 44a, and a rotational speed of the fifth motor generator 32a is positively related to a rotational speed of the right wheel 42a.

Since the fourth motor generator 31a and the fifth motor generator 32a work independently and do not interfere with each other, the two motors can adaptively adjust output rotational speeds according to torque required by corresponding wheels, thereby implementing a differential function.

It may be understood that in this working condition, the fourth motor generator 31a and the fifth motor generator 32a may rotate clockwise or counterclockwise, thereby implementing full electric forwarding or full electric backing.

Skid Working Condition:

An exemplary description is provided by using an example in which the left wheel 41a skids. The second braking device 63a brakes the third ring gear 13a, the third braking device 64a brakes the fourth ring gear 23a, the power connection device 65a is in a connected state, the power generated by the fourth motor generator 31a may be output to the second epicyclic gearing 2a at the right side with the power connection device 65a in the connected state, and may be coupled with the power generated by the fifth motor generator 32a, and the coupled power is output to the right wheel 42a that does not skid.

Therefore, when the left wheel skids, the fourth motor generator 31a at the left side still can output power to the right wheel that does not skid, and the fourth motor generator 31a does not need to reverse, thereby greatly improving the timeliness and a success rate of getting rid of the situation.

Coasting in Neutral:

The second braking device 63a, the third braking device 64a, and the power connection device 65a are all in the disconnected state, and the fourth motor generator 31a and the fifth motor generator 32a are in a follow-up state.

Braking Energy Recycling:

The second braking device 63a brakes the third ring gear 13a, the third braking device 64a brakes the fourth ring gear 23a, and the power connection device 65a may be in a disconnected state. Braking energy is output to corresponding motor generators with respective power output shafts and epicyclic gearings, to drive the motor generators to generate electricity.

Figure 10:
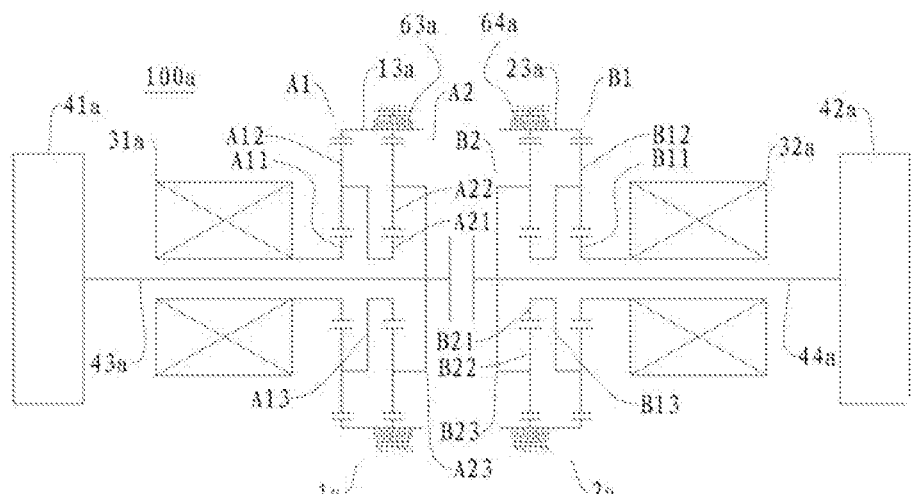
Figure 11:
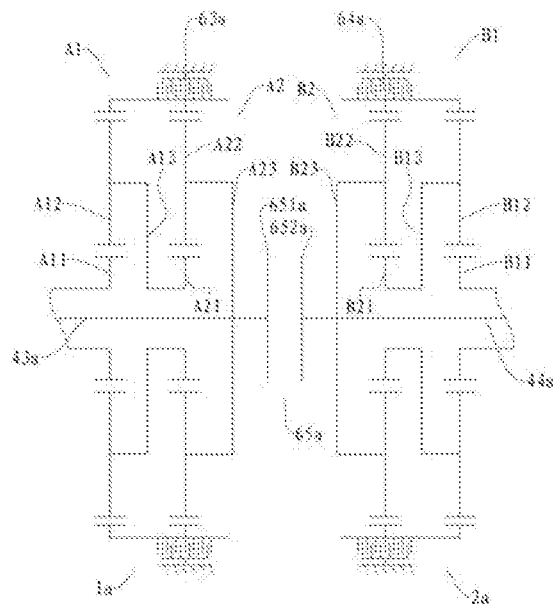
Figure 12:
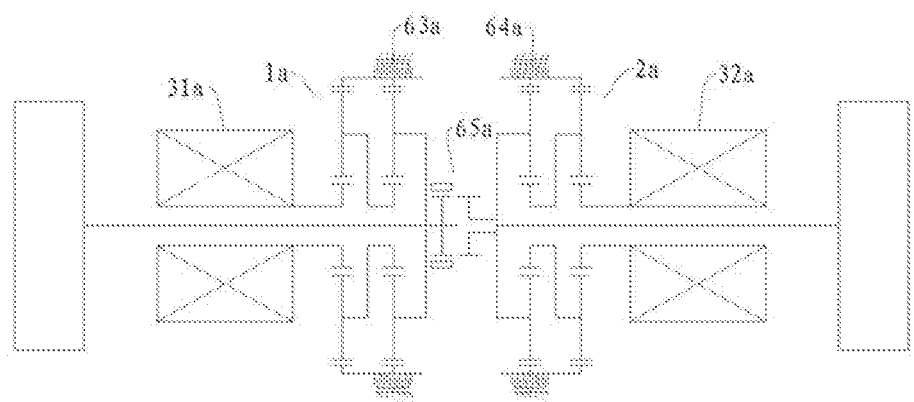

The following describes the driving system 100a in some other embodiments with reference to FIG. 10 to FIG. 12.

As shown in FIG. 10 to FIG. 12, the driving system 100a in some other embodiments of the present disclosure may include the fourth motor generator 31a, the fifth motor generator 32a, the first power output shaft 43a, the second power output shaft 44a, multiple first epicyclic gearings 1a, multiple epicyclic gearings 2a, the second braking device 63a, the third braking device 64a, and the power connection device 65a.

As shown in FIG. 10 to FIG. 12, the multiple first epicyclic gearings 1a (A1 and A2 shown in FIG. 10 to FIG. 12) are disposed in series between the fourth motor generator 31a and the first power output shaft 43a. The multiple first epicyclic gearings 1a are configured to output power from the fourth motor generator 31a to the first power output shaft 43a after performing speed changing on the power. Since the multiple first epicyclic gearings 1a are disposed in series, when the power of the fourth motor generator 31a is output to the first power output shaft 43a, the multiple first epicyclic gearings 1a can perform speed changing on the power sequentially, thereby implementing a multi-level speed change function. For example, each first epicyclic gearing plays a role of speed reduction and torque increase. Therefore, the multiple first epicyclic gearings 1a achieve an effect of multi-level speed reduction, thereby increasing the output torque of the fourth motor generator 31a.

Similarly, the multiple first epicyclic gearings 2a are disposed in series between the fifth motor generator 32a and the second power output shaft 44a. The multiple second epicyclic gearings 2a are configured to output power from the fifth motor generator 32a to the second power output shaft 44a after performing speed changing on the power. Since the multiple second epicyclic gearings 2a are disposed in series, when the power of the fifth motor generator 32a is output to the second power output shaft 44a, the multiple second epicyclic gearings 2a can perform speed changing on the power sequentially, thereby implementing a multi-level speed change function. For example, each second epicyclic gearing plays a role of speed reduction and torque increase. Therefore, the multiple second epicyclic gearings 2a achieve an effect of multi-level speed reduction, thereby increasing the output torque of the fifth motor generator 32a.

The multiple first epicyclic gearings 1a may be coaxially arranged, the multiple second epicyclic gearings 2a may be coaxially arranged, and a central axis of the multiple first epicyclic gearings 1*a* may overlap a central axis of the multiple second epicyclic gearings 2*a*.

The first power output shaft 43*a* may be connected to one wheel 41*a* in the second pair of wheels of the vehicle, the second power output shaft 44*a* may be connected to the other wheel 42*a* in the second pair of wheels, and in this case, the power coupling device 100 is used to drive the first pair of wheels. The first pair of wheels is one of the pair of front wheels and the pair of rear wheels, and the second pair of wheels is the remaining pair.

As shown in FIG. 10 to FIG. 12, each of the first epicyclic gearing 1*a* and the second epicyclic gearing 2*a* may be a one-row epicyclic gearing, and the first epicyclic gearing 1*a* may include a sun gear, a planet gear, a planet carrier, and a ring gear (the multiple first epicyclic gearings 1*a* share the ring gear, that is, a first sharing ring gear 13*a*).

The planet gear is mounted on the planet carrier and is disposed between the sun gear and the ring gear, and the planet gear separately meshes with the sun gear and the ring gear. The planet gear may be mounted on the planet carrier with a planet gear shaft, there may be multiple planet gears, and the planet gears are distributed around the sun gear at an even interval. For example, considering the power transmission stability and the manufacturing costs, there may be three planet gears, the three planet gears are evenly distributed at an outside of the sun gear, and an angle between two adjacent planet gears is approximately 120 degrees.

A meshing manner between the planet gear and the sun gear is outer meshing. A meshing manner between the planet gear and the ring gear is inner meshing. That is, teeth are formed on an inner periphery of the ring gear, and the planet gear meshes with the teeth on the inner periphery of the ring gear. The planet gear may rotate around an axis of the planet gear shaft, and may also revolve around the sun gear.

Similarly, the second epicyclic gearing 2*a* may include a sun gear, a planet gear, a planet carrier, and a ring gear (the multiple second epicyclic gearings 2*a* share the ring gear, that is, a second sharing ring gear 23*a*). In addition, a relative location relationship, a connection relationship, and an action relationship between components may be the same as those of the first epicyclic gearing 1*a*. Therefore, details are not described herein again. In addition, the connection relationships and the like of the multiple first epicyclic gearings 1*a* and the multiple second epicyclic gearings 2*a* will be described in detail below with reference to specific embodiments.

As shown in FIG. 10 to FIG. 12, the multiple first epicyclic gearings 1*a* share one first sharing ring gear 13*a*, and the multiple second epicyclic gearings 2*a* share one second sharing ring gear 23*a*. Therefore, the driving system 100*a* has a more compact structure and a smaller volume, facilitating arrangement.

The second braking device 63*a* is configured to brake the first sharing ring gear 13*a*, and the third braking device 64*a* is configured to brake the second sharing ring gear 23*a*. In some embodiments of the present disclosure, the second braking device 63*a* and the third braking device 64*a* may be brakes. However, this is not limited thereto.

As shown in FIG. 10 to FIG. 12, the power connection device 65*a* is configured to connect the first power output shaft 43*a* and the second power output shaft 44*a*, so that the first power output shaft 43*a* and the second power output shaft 44*a* are in rigid connection, and further, the first power output shaft 43*a* and the second power output shaft 44*a* can rotate in a same direction at a same speed. That is, when the power connection device 65*a* is in a connected state, the first power output shaft 43*a* and the second power output shaft 44*a* remain in a synchronized state, and when the power connection device 65*a* is in a disconnected state, the first power output shaft 43*a* and the second power output shaft 44*a* can perform differential rotation. That is, the first power output shaft 43*a* and the second power output shaft 44*a* may rotate at different rotational speeds (or may rotate at a same rotational speed).

It should be noted that that the power connection device 65*a* is used to connect the first power output shaft 43*a* and the second power output shaft 44*a* should be understood in a generalized way. For example, the power connection device 65*a* may directly connect the first power output shaft 43*a* and the second power output shaft 44*a* or disconnect the first power output shaft 43*a* from the second power output shaft 44*a*. Certainly, optionally, the power connection device 65*a* may connect or disconnect two other components to indirectly implement connection and disconnection between the first power output shaft 43*a* and the second power output shaft 44*a*, and the two components may be components connected to the first power output shaft 43*a* and the second power output shaft 44*a*. For example, the two components are a planet carrier A23 and a planet carrier B23.

When the vehicle having the driving system 100*a* in this embodiment of the present disclosure, for example, the vehicle 10000, travels on a flat road and travels along a straight line, the second braking device 63*a* and the third braking device 64*a* may respectively drive the first sharing ring gear 13*a* and the second sharing ring gear 23*a*, and the fourth motor generator 31*a* and the fifth motor generator 32*a* may output power at a same rotational speed. In this way, rotational speeds of corresponding wheels theoretically are the same after the multiple respective epicyclic gearings perform speed reduction, thereby ensuring that the vehicle 10000 can travel along a straight line smoothly.

For another example, when the vehicle 10000 travels on an uneven road or turns a corner, the second braking device 63*a* and the third braking device 64*a* may respectively brake the first sharing ring gear 13*a* and the second sharing ring gear 23*a*. In this case, a rotational speed difference theoretically may exist between rotational speeds of wheels at two sides. Using a left turn as an example, a turn radius of the left wheel is relatively small and a turn radius of the right wheel is relatively large. To ensure solely rolling movement between the wheels and the ground, the rotational speed of the left wheel needs to be less than the rotational speed of the right wheel. In this case, the output rotational speed of the fourth motor generator 31*a* may be less than the output rotational speed of the fifth motor generator 32*a*, and a specific rotational speed difference may be calculated indirectly according to the steering angle of the steering wheel. For example, a driver rotates the steering wheel counterclockwise (to the left) by a particular angle, a controller of the vehicle 10000 may calculate a turn radius of the vehicle 10000 based on the steering angle, and after the turn radius of the vehicle 10000 is determined, a relative rotational speed difference between the wheels at the two sides can be determined. In this case, the controller may control the fourth motor generator 31*a* and the fifth motor generator 32*a* to output power at matched rotational speeds, so that the rotational speed difference of the two motor generators can match the rotational speed difference required by the wheels. In this way, the two wheels can obtain expected rotational speeds after the two epicyclic gearings perform speed reduction, so that the vehicle can turn a corner with solely rolling movement.

The foregoing description is based on an example in which the fourth motor generator 31*a* and the fifth motor generator 32a are used as electric motors. Certainly, the fourth motor generator 31a and the fifth motor generator 32a may alternatively work as generators. In this case, similarly, the second braking device 63a and the third braking device 64a may respectively brake the first sharing ring gear 13a and the second sharing ring gear 23a, and the fourth motor generator 31a and the fifth motor generator 32a may work as generators, to recycle braking energy. That is, when the fourth motor generator 31a and the fifth motor generator 32a output power as electric motors or recycle energy and generate electricity as generators, the second braking device 63a and the third braking device 64a are in a braking state, that is, respectively brake the corresponding sharing ring gears, and the power connection device 65a is in a disconnected state.

Certainly, it may be understood that the multiple first epicyclic gearings 1a and the multiple second epicyclic gearings 2a may use a same transmission ratio. That is, the sun gears are used as power input ends and the planet carriers are used as power output ends. In this case, the two epicyclic gearings may use a same transmission ratio. For example, a quantity of teeth of a sun gear A11 may be the same as a quantity of teeth of a sun gear B11, a quantity of teeth of a planet gear A12 may be the same as a quantity of teeth of a planet gear B12, a quantity of teeth of a sun gear A21 may be the same as a quantity of teeth of a sun gear B21, a quantity of teeth of a planet gear A22 may be the same as a quantity of teeth of a planet gear B22, and a quantity of teeth of the first sharing ring gear 13a may be the same as a quantity of teeth of a second sharing ring gear 23a.

Particularly, when the vehicle 10000 travels in a poor road condition, for example, the vehicle 10000 travels on a road such as a muddy or mollic gravel road or a sandy road, using a muddy road as an example, the vehicle 10000 may sink into the mud, leading to empty running. That is, the vehicle 10000 skids (a skid phenomenon and a reason of the skid phenomenon are known by a person skilled in the art).

For a conventional differential having a self-locking function, when the wheel skids, only the differential needs to be controlled to be self-locked, so that the capability of the vehicle 10000 of getting rid of this situation can be improved at least to some extent.

Although the driving system 100a in this embodiment of the present disclosure has a differential function, a structure is greatly different from that of a conventional differential, and therefore, a conventional differential self-locking structure cannot be used. To improve the passing performance of the vehicle 10000, and improve the capability of the vehicle 10000 of adapting to a poorer road condition, the driving system 100a in some embodiments of the present disclosure can further implement a self-locking function under the premise of implementing a differential function.

According to some embodiments of the present disclosure, as shown in FIG. 10 to FIG. 12, when a wheel at one side of the vehicle skids, the power connection device 65a connects the first power output shaft 43a and the second power output shaft 44a, and the second braking device 63a and the third braking device 64a respectively brake the first sharing ring gear 13a and the second sharing ring gear 23a. Therefore, the fourth motor generator 31a and the fifth motor generator 32a may output generated power from a wheel that does not skid, to improve a skid phenomenon of the wheel, and improve the passing performance of the vehicle.

To sum up, in the driving system 100a in this embodiment of the present disclosure, a full electric mode or a braking energy recycling mode of the fourth motor generator 31a and the fifth motor generator 32a may be implemented with braking functions of the second braking device 63a and the third braking device 64a, and wheels at two sides can obtain different torque by separately controlling output rotational speeds of the fourth motor generator 31a and the fifth motor generator 32a, to implement a differential function. In addition, the driving system 100a in this embodiment of the present disclosure has a small quantity of parts and a compact and simple structure, and occupies a small volume, thereby facilitating arrangement.

Particularly, in the driving system 100a in this embodiment of the present disclosure, a mechanical self-locking differential structure in a conventional power-driven system may not be disposed, and a conventional mechanical self-locking differential function can be implemented with a synchronization function of the power connection device 65a. Therefore, the power transmission system 100a in this embodiment of the present disclosure has a more compact structure and lower costs.

As shown in FIG. 10 to FIG. 12, the following describes in detail a series mode of the multiple first epicyclic gearings 1a and a series mode of the multiple second epicyclic gearings 2a. It may be understood that the series mode of the multiple first epicyclic gearings 1a may be the same as the series mode of the multiple second epicyclic gearings 2a. In this way, the driving system 100a can have high symmetry, so that a center of gravity of the driving system 100a is partial to a central region of the driving system 100a or is directly on the central region. Therefore, the stability of the vehicle can be improved, and the weight ratio between the front and the rear is more appropriate.

It should be noted that the "link" may be understood as that multiple parts (for example, two parts) move in a linkage manner. Using an example in which two parts are linked, when one part moves, the other part moves together.

For example, in some embodiments of the present disclosure, that a gear is linked to a shaft may be understood as that when the gear rotates, the linked shaft also rotates, or when the shaft rotates, the linked gear also rotates.

For another example, that a shaft is linked to a shaft may be understood as that when one shaft rotates, the other linked shaft also rotates.

For another example, that a gear is linked to a gear may be understood as that when one gear rotates, the other linked gear also rotates.

Certainly, it should be understood that when one of two linked parts is relatively static, the other part may also be relatively static.

Unless otherwise specified, the descriptions about "linkage" below in the present disclosure should be understood in this way.

Further, the sun gear A11 in the first group of first epicyclic gearing A1 in the multiple first epicyclic gearings 1a is linked to the fourth motor generator 31a. For example, a rotor of the fourth motor generator 31a may be coaxially connected to the sun gear A11. The planet carrier A23 in the last group of first epicyclic gearing A2 in the multiple first epicyclic gearings 1a is connected to, for example, is coaxially connected to, the first power output shaft 43a.

Similarly, the sun gear B11 in the first group of second epicyclic gearing B1 in the multiple second epicyclic gearings 2a is linked to the fifth motor generator 32a. For example, a rotor of the fifth motor generator 32a may be coaxially connected to the sun gear B11. The planet carrier B23 in the last group of second epicyclic gearing B2 in the multiple second epicyclic gearings 2a is connected to, for example, is coaxially connected to, the second power output shaft 44a.

In a further embodiment, in the multiple first epicyclic gearings 1a, a planet carrier A13 of a first epicyclic gearing A1 is connected to, for example, is coaxially connected to, a sun gear A21 of a following epicyclic gearing A2, and in the multiple second epicyclic gearings 2a, a planet carrier B13 of a second epicyclic gearings B1 is connected to, for example, is coaxially connected to, a sun gear B21 of a following second epicyclic gearing B2.

For example, as shown in FIG. 10 to FIG. 12, there are two first epicyclic gearings 1a and two second epicyclic gearings 2a, and a planet carrier A13 of the first group of first epicyclic gearing A1 is connected to a sun gear A21 of the last group (that is, the second group) of first epicyclic gearing A2. Similarly, a planet carrier B13 of the first group of second epicyclic gearing B1 is connected to a sun gear B21 of the last group (that is, the second group) of second epicyclic gearing B2.

It should be noted that although the foregoing embodiment gives one feasible series mode of epicyclic gearings, this feasible implementation is merely exemplary description, but cannot be understood as a limitation to the protection scope of the present disclosure or as an implication that the foregoing series mode must be used in the present disclosure. A person skilled in the art can modify and/or combine the foregoing series mode after reading the foregoing content of this specification, and a formed new solution should belong to an equivalent implementation of the series mode, and should fall within the protection scope of the present disclosure.

In addition, it should be noted that unless otherwise specified, in the description of the "motor generator" in the present disclosure, the motor generator may be understood as a motor having functions of a generator and an electric motor.

In an optional implementation, as shown in FIG. 10 and FIG. 11, the power connection device 65a may be a clutch. The clutch includes a driving part 651a and a driven part 652a that may be connected and disconnected, the driving part 651a is connected to the first power output shaft 43a, and the driven part 652a is connected to the second power output shaft 44a.

Certainly, the present disclosure is not limited thereto. In some other embodiments, as shown in FIG. 12, the power connection device 65a may be a synchronizer, and the synchronizer is disposed on one of the first power output shaft 43a and the second power output shaft 44a and is used to connect to the other one.

In addition, the fourth motor generator 31a and the fifth motor generator 32a may be disposed in a bilaterally symmetric manner, for example, are arranged symmetrically around the power connection device 65a. The multiple first epicyclic gearings 1a and the multiple second epicyclic gearings 2a may be disposed in a bilaterally symmetric manner, for example, are arranged symmetrically around the power connection device 65a. In addition, the fourth motor generator 31a and the fifth motor generator 32a may be respectively located at an outside of the multiple first epicyclic gearings 1a and an outside of the multiple second epicyclic gearings 2a. That is, using FIG. 6 as an example, the fourth motor generator 31a is located at the outside, that is, the left side, of the multiple first epicyclic gearings 1a, and the fifth motor generator 32a is located at the outside, that is, the right side, of the multiple second epicyclic gearings 2a.

In an optional implementation, the first power output shaft 43a and the second power output shaft 44a may be axle shafts. For example, the first power output shaft 43a may be a left axle shaft, and the second power output shaft 44a may be a right axle shaft.

The following describes a construction, a connection relationship, and typical working conditions of the driving system 100a in the embodiment of FIG. 10 with reference to the accompanying drawings.

As shown in FIG. 10, the driving system 100a shown in this embodiment mainly includes two one-row epicyclic gearings A1 and A2 at the left side, two one-row epicyclic gearings B1 and B2 at the right side, two motor generators 31a and 32a, two braking devices 63a and 64a, the power connection device 65a, and the like.

Specifically, the two first epicyclic gearings A1 and A2 at the left side are disposed in series and share one first sharing ring gear 13a. A sun gear A11 of the first group of first epicyclic gearing A1 is coaxially connected to the fourth motor generator 31a, a planet gear A12 of the first group of first epicyclic gearing A1 is mounted on the planet carrier A13, the planet gear A12 separately meshes with the sun gear A11 and the first sharing ring gear 13a, and the planet carrier A13 is coaxially connected to a sun gear A21 of the second group of first epicyclic gearing A2. A planet gear A22 of the second group of first epicyclic gearing A2 is mounted on a planet carrier A23, the planet gear A22 separately meshes with the sun gear A21 and the first sharing ring gear 13a, the planet carrier A23 is coaxially connected to the first power output shaft 43a, and the first power output shaft 43a is connected to the left wheel 41a. The first motor generator 43a, the sun gear A11, and the sun gear A21 are coaxially freely sleeved on the first power output shaft 43a, and the first power output shaft 43a may be a left axle shaft.

The two second epicyclic gearings 2a at the right side are disposed in series and share one second sharing ring gear 23a. A sun gear B11 of the first group of second epicyclic gearing B1 is coaxially connected to the fifth motor generator 32a, a planet gear B12 of the first group of second epicyclic gearing B1 is mounted on a planet carrier B13, the planet gear B12 separately meshes with the sun gear B11 and the second sharing ring gear 23a, and the planet carrier B13 is coaxially connected to a sun gear B21 of the second group of second epicyclic gearing B2. A planet gear B22 of the second group of second epicyclic gearing B2 is mounted on a planet carrier B23, the planet gear B22 separately meshes with the sun gear B21 and the second sharing ring gear 23a, the planet carrier B23 is coaxially connected to the second power output shaft 44a, and the second power output shaft 44a is connected to the right wheel 42a. The fifth motor generator 32a, the sun gear B11, and the sun gear B21 are coaxially freely sleeved on the second power output shaft 44a, and the second power output shaft 44a may be a right axle shaft.

The second braking device 63a is used to brake the first sharing ring gear 13a, the third braking device 64a is used to brake the second sharing ring gear 23a, and the power connection device 65a is disposed between the multiple first epicyclic gearings 1a and the multiple second epicyclic gearings 2a and is used to selectively connect the first power output shaft 43a and the second power output shaft 44a.

The following describes typical working conditions of the driving system 100a in the embodiment of FIG. 10.

Full electric working condition (relying on the fourth motor generator 31a and the fifth motor generator 32a):

The second braking device 63a brakes the first sharing ring gear 13a, the third braking device 64a brakes the second sharing ring gear 23*a*, and the power connection device 65*a* is in a disconnected state. The fourth motor generator 31*a* and the fifth motor generator 32*a* may separately work as an electric motor. Therefore, power generated by the fourth motor generator 31*a* is output to the left wheel 41*a* after the two first epicyclic gearings 1*a* perform speed reduction, and a rotational speed of the fourth motor generator 31*a* is positively related to a rotational speed of the left wheel 41*a*. Power generated by the fifth motor generator 32*a* is output to the right wheel 42*a* after the two second epicyclic gearings 2*a* perform speed reduction, and a rotational speed of the fifth motor generator 32*a* is positively related to a rotational speed of the right wheel 42*a*.

Since the fourth motor generator 31*a* and the fifth motor generator 32*a* work independently and do not interfere with each other, the two motors can adaptively adjust output rotational speeds according to torque required by corresponding wheels, thereby implementing a differential function.

It may be understood that in this working condition, the fourth motor generator 31*a* and the fifth motor generator 32*a* may rotate clockwise or counterclockwise, thereby implementing full electric forwarding or full electric backing.

Skid Working Condition:

An exemplary description is provided by using an example in which the left wheel 41*a* skids. The second braking device 63*a* brakes the first sharing ring gear 13*a*, the third braking device 64*a* brakes the second sharing ring gear 23*a*, the power connection device 65*a* is in a connected state, the power generated by the fourth motor generator 31*a* may be output to the second epicyclic gearing at the right side with a connection function of the power connection device 65*a*, and may be coupled with the power generated by the fifth motor generator 32*a* on the planet carrier B23, and the coupled power is output to the right wheel 42*a* that does not skid.

Therefore, when the left wheel skids, the fourth motor generator 31*a* at the left side still can output power to the right wheel that does not skid, and the fourth motor generator 31*a* does not need to reverse, thereby greatly improving the timeliness and a success rate of getting rid of the situation.

Coasting in Neutral:

The second braking device 63*a*, the third braking device 64*a*, and the power connection device 65*a* are all in the disconnected state, and the fourth motor generator 31*a* and the fifth motor generator 32*a* are in a follow-up state.

Braking Energy Recycling:

The second braking device 63*a* brakes the first sharing ring gear 13*a*, the third braking device 64*a* brakes the second sharing ring gear 23*a*, and the power connection device 65*a* may be in a disconnected state. Braking energy is output to corresponding motor generators with respective power output shafts and epicyclic gearings, to drive the motor generators to generate electricity.

The following describes in detail the driving system 100*a* in some other embodiments with reference to FIG. 13 to FIG. 17.

As shown in FIG. 13 to FIG. 17, the driving system 100*a* in this embodiment of the present disclosure may include a first epicyclic gearing 1*a*, a second epicyclic gearing 2*a*, a fourth motor generator 31*a*, a fifth motor generator 32*a*, an intermediate transmission assembly 4*b*, and a second braking device 61*a*.

As shown in FIG. 13 to FIG. 17, the first epicyclic gearing 1*a* may be a one-row epicyclic gearing, and the first epicyclic gearing 1*a* may include a third sun gear 11*a*, a third planet gear 12*a*, a third planet carrier 14*a*, and a third ring gear 13*a*. The third planet gear 12*a* is mounted on the third planet carrier 14*a* and is disposed between the third sun gear 11*a* and the third ring gear 13*a*, and the third planet gear 12*a* separately meshes with the third sun gear 11*a* and the third ring gear 13*a*. The third planet gear 12*a* may be mounted on the third planet carrier 14*a* with a planet gear shaft. There may be multiple third planet gears 12*a*, and the third planet gears are distributed around the third sun gear 11*a* at an even interval. For example, considering the power transmission stability and the manufacturing costs, there may be three third planet gears 12*a*, the three third planet gears are evenly distributed at an outside of the third sun gear 11*a*, and a degree between two adjacent third planet gears 12*a* is approximately 120 degrees.

A meshing manner between the third planet gear 12*a* and the third sun gear 11*a* is outer meshing. A meshing manner between the third planet gear 12*a* and the third ring gear 13*a* is inner meshing. That is, teeth are formed on an inner periphery of the third ring gear 13*a*, and the third planet gear 12*a* meshes with the teeth on the inner periphery of the third ring gear 13*a*. The third planet gear 12*a* may rotate around an axis of the planet gear shaft, and may also revolve around the sun gear.

Similarly, as shown in FIG. 13 to FIG. 17, the second epicyclic gearing 2*a* may be a one-row epicyclic gearing, and the second epicyclic gearing 2*a* may include a fourth sun gear 21*a*, a fourth planet gear 22*a*, a fourth planet carrier 24*a*, and a fourth ring gear 23*a*. The fourth planet gear 22*a* is mounted on the fourth planet carrier 24*a* and is disposed between the fourth sun gear 21*a* and the fourth ring gear 23*a*, and the fourth planet gear 22*a* separately meshes with the fourth sun gear 21*a* and the fourth ring gear 23*a*. The fourth planet gear 22*a* may be mounted on the fourth planet carrier 24*a* with a planet gear shaft. There may be multiple fourth planet gears 22*a*, and the fourth planet gears are distributed around the fourth sun gear 21*a* at an even interval. For example, considering the power transmission stability and the manufacturing costs, there may be three fourth planet gears 22*a*, the three fourth planet gears are evenly distributed at an outside of the fourth sun gear 21*a*, and a degree between two adjacent fourth planet gears 22*a* is approximately 120 degrees.

A meshing manner between the fourth planet gear 22*a* and the fourth sun gear 21*a* is outer meshing. A meshing manner between the fourth planet gear 22*a* and the fourth ring gear 23*a* is inner meshing. That is, teeth are formed on an inner periphery of the fourth ring gear 23*a*, and the fourth planet gear 22*a* meshes with the teeth on the inner periphery of the fourth ring gear 23*a*. The fourth planet gear 22*a* may rotate around an axis of the planet gear shaft, and may also revolve around the sun gear.

Figure 13:
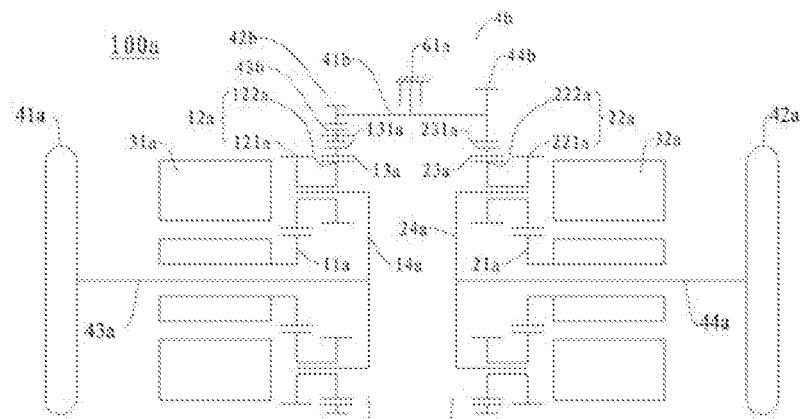
Figure 14:
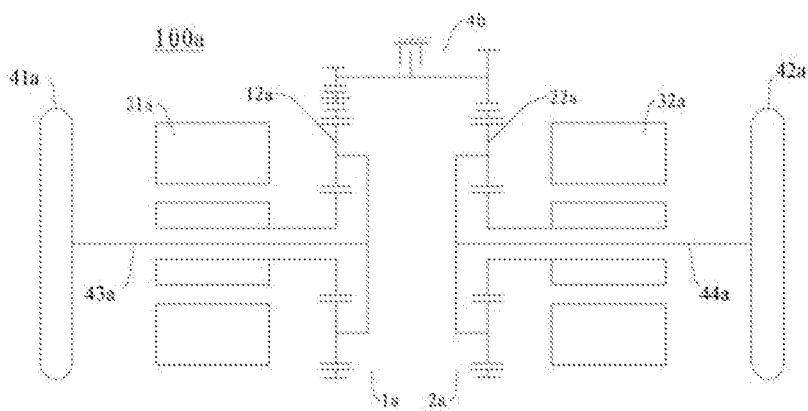

In some implementations of the present disclosure, as shown in FIG. 13, the third planet gear 12*a* may include a first gear part 121*a* and a second gear part 122*a* that are coaxially arranged and rotate synchronously, the first gear part 121*a* meshes with the third sun gear 11*a*, and the second gear part 122*a* meshes with the third ring gear 13*a*. The first gear part 121*a* and the second gear part 122*a* may be fixedly connected with one shaft. The first gear part 121*a* may be a small tooth part and the second gear part 122*a* may be a large tooth part. That is, a quantity of teeth of the first gear part 121*a* may be less than a quantity of teeth of the second gear part 122*a*. Therefore, when power output by the fourth motor generator 31*a* is transmitted with the first gear part 121*a* and the second gear part 122*a*, the first gear part 121*a* and the second gear part 122*a* form a speed reduction mechanism, implementing an effect of speed reduction and torque increase for the fourth motor generator 31a. Certainly, in some other embodiments of the present disclosure, the first gear part 121a may be a large tooth part and the second gear part 122a may be a small tooth part.

Similarly, as shown in FIG. 13, the fourth planet gear 22a may include a third gear part 221a and a fourth gear part 222a that are coaxially arranged and rotate synchronously, the third gear part 221a meshes with the fourth sun gear 21a, and the fourth gear part 222a meshes with the fourth ring gear 23a. The third gear part 221a and the fourth gear part 222a may be fixedly connected with one shaft. The third gear part 221a may be a small tooth part and the fourth gear part 222a may be a large tooth part. That is, a quantity of teeth of the third gear part 221a may be less than a quantity of teeth of the fourth gear part 222a. Therefore, when power output by the fifth motor generator 32a is transmitted with the third gear part 221a and the fourth gear part 222a, the third gear part 221a and the fourth gear part 222a form a speed reduction mechanism, implementing an effect of speed reduction and torque increase for the fifth motor generator 32a. Certainly, in some other embodiments of the present disclosure, the third gear part 221a may be a large tooth part and the fourth gear part 222a may be a small tooth part.

In some embodiments of the present disclosure, the first gear part 121a and the second gear part 122a may form an integrated structure, so as to form a duplicate gear. Similarly, the third gear part 221a and the fourth gear part 222a may also form an integrated structure, so as to form a duplicate gear. Therefore, the structure is simple and compact, and the transmission is reliable.

The third planet carrier 14a and the fourth planet carrier 24a may be used as power output ends of the power-driven system 100a. For example, the third planet carrier 14a and the fourth planet carrier 24a may output power of a power source such as the fourth motor generator 31a and/or the fifth motor generator 32a to, for example, wheels 41a and 42a. In some embodiments of the present disclosure, the third planet carrier 14a and the fourth planet carrier 24a may be respectively linked to the two wheels 41a and 42a in the second pair of wheels, so that the third planet carrier 14a and the fourth planet carrier 24a can output power of the power-driven system 100a to the second pair of wheels 41a and 42a, and the vehicle 10000 can travel normally.

For example, the power coupling device 100 may drive the first pair of wheels, the third planet carrier 14a and the fourth planet carrier 24a may respectively drive the second pair of wheels, the first pair of wheels is one of the pair of front wheels and the pair of rear wheels, and the second pair of wheels is the remaining pair.

As shown in FIG. 13 to FIG. 17, the fourth motor generator 31a is linked to the third sun gear 11a. For example, a rotor of the fourth motor generator 31a may be coaxially connected to the third sun gear 11a. However, this is not limited thereto.

It should be noted that the "link" may be understood as that multiple parts (for example, two parts) move in a linkage manner. Using an example in which two parts are linked, when one part moves, the other part moves together.

For example, in some embodiments of the present disclosure, that a gear is linked to a shaft may be understood as that when the gear rotates, the linked shaft also rotates, or when the shaft rotates, the linked gear also rotates.

For another example, that a shaft is linked to a shaft may be understood as that when one shaft rotates, the other linked shaft also rotates.

For another example, that a gear is linked to a gear may be understood as that when one gear rotates, the other linked gear also rotates.

Certainly, it should be understood that when one of two linked parts is relatively static, the other part may also be relatively static.

Unless otherwise specified, the descriptions about "linkage" below in the present disclosure should be understood in this way.

Similarly, the fifth motor generator 32a is linked to the fourth sun gear 21a. For example, the rotor of the fifth motor generator 32a may be coaxially connected to the fourth sun gear 21a. However, this is not limited thereto.

It should be noted that unless otherwise specified, in the description of the "motor generator" in the present disclosure, the motor generator may be understood as a motor having functions of a generator and an electric motor.

As shown in FIG. 13 to FIG. 17, the intermediate transmission assembly 4b is configured to be separately linked to the third ring gear 13a and the fourth ring gear 23a. The intermediate transmission assembly 4b may be disposed between the third ring gear 13a and the fourth ring gear 23a, and the third ring gear 13a, the intermediate transmission assembly 4b, and the fourth ring gear 23a move at the same time or are relatively static.

The second braking device 61a is configured to brake the intermediate transmission assembly 4b. When the second braking device 61a brakes the intermediate transmission assembly 4b, the third ring gear 13a and the fourth ring gear 23a are indirectly braked, and after the second braking device 61a releases the intermediate transmission assembly 4b, the intermediate transmission assembly 4b, the third ring gear 13a, and the fourth ring gear 23a may move in a linkage manner.

Therefore, when the second braking device 61a is in a braking state, the intermediate transmission assembly 4b, the third ring gear 13a, and the fourth ring gear 23a are braked. The power generated by the fourth motor generator 31a may be output to the corresponding wheel, for example, the left wheel 41a, with the third planet carrier 14a after passing through the third sun gear 11a and the third planet gear 12a, the power generated by the fifth motor generator 32a may be output to the corresponding wheel, for example, the right wheel 42a, with the fourth planet carrier 24a after passing through the fourth sun gear 21a and the fourth planet gear 22a, and the two motor generators respectively control rotational speeds of the corresponding wheels, thereby implementing a differential function.

For example, when the vehicle 10000 travels on a flat road and travels along a straight line, the fourth motor generator 31a and the fifth motor generator 32a may output power at a same rotational speed. In this way, rotational speeds of corresponding wheels theoretically are the same after respective epicyclic gearings perform speed reduction, thereby ensuring that the vehicle 10000 can travel along a straight line smoothly.

For another example, when the vehicle 10000 travels on an uneven road or turns a corner, a rotational speed difference theoretically may exist between rotational speeds of wheels at two sides. Using a left turn as an example, a turn radius of the left wheel is relatively small and a turn radius of the right wheel is relatively large. To ensure solely rolling movement between the wheels and the ground, the rotational speed of the left wheel needs to be less than the rotational speed of the right wheel. In this case, an output rotational speed of the fourth motor generator 31a may be less than an output rotational speed of the fifth motor generator 32a, and a specific rotational speed difference may be calculated indirectly according to a steering angle of a steering wheel. For example, a driver rotates the steering wheel counterclockwise (to the left) by a particular angle, a controller of the vehicle 10000 may calculate a turn radius of the vehicle 10000 based on the steering angle, and after the turn radius of the vehicle 10000 is determined, a relative rotational speed difference between the wheels at the two sides can be determined. In this case, the controller may control the fourth motor generator 31*a* and the fifth motor generator 32*a* to output power at corresponding rotational speeds, so that the rotational speed difference of the two motor generators can match the rotational speed difference required by the wheels. In this way, the two wheels can obtain expected rotational speeds after the two epicyclic gearings perform speed reduction, so that the vehicle can turn a corner with solely rolling movement.

The foregoing description is based on an example in which the fourth motor generator 31*a* and the fifth motor generator 32*a* are used as electric motors. Certainly, the fourth motor generator 31*a* and the fifth motor generator 32*a* may alternatively work as generators. In this case, similarly, the second braking device 61*a* still may brake the intermediate transmission assembly 4*b*, and the fourth motor generator 31*a* and the fifth motor generator 32*a* may work as generators, thereby recycling braking energy.

Certainly, it may be understood that the first epicyclic gearing 1*a* and the second epicyclic gearing 2*a* may use a same transmission ratio. That is, the sun gears are used as power input ends and the planet carriers are used as power output ends. In this case, the two epicyclic gearings may use a same transmission ratio. That is, a quantity of teeth of the third sun gear 11*a* may be the same as a quantity of teeth of the fourth sun gear 21*a*, a quantity of teeth of the third planet gear 12*a* may be the same as a quantity of teeth of the fourth planet gear 22*a*, and a quantity of teeth of the third ring gear 13*a* may be the same as a quantity of teeth (inner teeth) of the fourth ring gear 23*a*.

To sum up, in the power-driven system 100*a* in this embodiment of the present disclosure, a full electric mode or a braking energy recycling mode of the fourth motor generator 31*a* and the fifth motor generator 32*a* may be implemented with a braking function of the second braking device 61*a*, and wheels at two sides can obtain different torque by separately controlling output rotational speeds of the fourth motor generator 31*a* and the fifth motor generator 32*a*, to implement a differential function. In addition, the power-driven system 100*a* in this embodiment of the present disclosure has a small quantity of parts and a compact and simple structure, and occupies a small volume, thereby facilitating arrangement.

The following describes in detail the power-driven system 100*a* in the further embodiment of the present disclosure with reference to FIG. 13 to FIG. 17.

The vehicle 10000 sometimes may travel in a poor road condition, for example, travel on a road such as a muddy or mollic gravel road or a sandy road. Using a muddy road as an example, when the vehicle 10000 travels on a muddy road, the vehicle 10000 may sink into the mud, leading to empty running. That is, the vehicle 10000 skids (a skid phenomenon and a reason of the skid phenomenon are known by a person skilled in the art). For a conventional differential having a self-locking function, when the wheel skids, only the differential needs to be controlled to be self-locked, so that the capability of the vehicle 10000 of getting rid of this situation can be improved at least to some extent.

Although the power-driven system 100*a* in this embodiment of the present disclosure has a differential function, a structure is greatly different from that of a conventional differential, and therefore, a conventional differential self-locking structure cannot be used. Therefore, to improve the passing performance of the vehicle 10000, and improve the capability of the vehicle 10000 of adapting to a poorer road condition, the power-driven system 100*a* in some embodiments of the present disclosure can further implement a self-locking function under the premise of implementing a differential function.

Figures 16, 17, 18, 19:
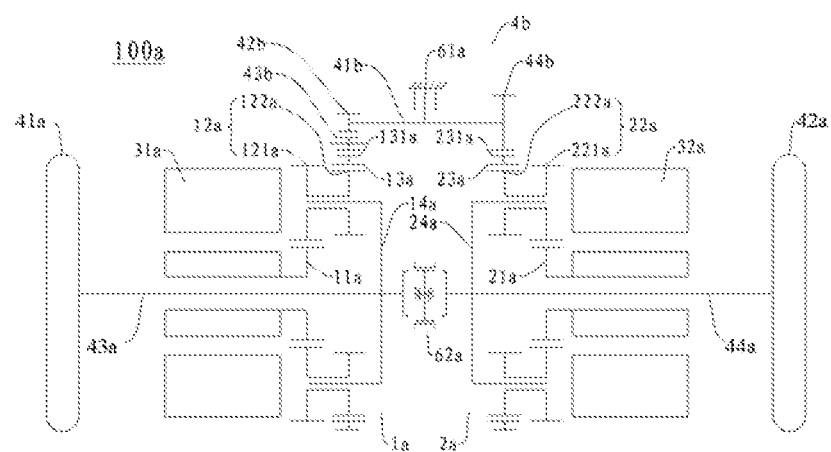
FIG. 18 and FIG. 19 are schematic diagrams of a vehicle according to an embodiment of the present disclosure.

In some embodiments of the present disclosure, for example, with reference to FIG. 16 and FIG. 17, the power-driven system 100*a* further includes the third braking device 62*a*. The third braking device 62*a* is configured to brake the third planet carrier 14*a* or the fourth planet carrier 24*a*. That is, in some particular working conditions, for example, the vehicle 10000 skids, the third braking device 62*a* can selectively brake the third planet carrier 14*a* or the fourth planet carrier 24*a*. More specifically, in this case, the third braking device 62*a* brakes a planet carrier corresponding to a skidding wheel.

Using an example in which the third planet carrier 14*a* and the fourth planet carrier 24*a* are respectively connected to two wheels 41*a* and 42*a* in the second pair of wheels of the vehicle 10000, when the wheel at one side skids, the third braking device 62*a* brakes the planet carrier corresponding to the skidding wheel, so that a motor generator corresponding to the skidding wheel can output generated power to a planet carrier at the other side with the intermediate transmission assembly 4*b*, the power is coupled with power of a motor generator at the other side, and the coupled power is output to the wheel at the other side, that is, the wheel that does not skid, thereby improving the capability of the vehicle 10000 of getting rid of the situation.

Referring to FIG. 16 and FIG. 17, if the left wheel 41*a* skids, the third braking device 62*a* brakes the third planet carrier 14*a* at the left side. In this case, according to a movement characteristic of an epicyclic gearing, power generated by the fourth motor generator 31*a* at the left side can be output with the third ring gear 13*a*, and the third ring gear 13*a* is linked to the fourth ring gear 23*a* at the right side with the intermediate transmission assembly 4*b*. Therefore, the power generated by the fourth motor generator 31*a* can be transmitted to the fourth ring gear 23*a* at the right side. In this case, the fifth motor generator 32*a* at the right side can also output power, the power of the fourth motor generator and the power of the fifth motor generator are coupled on the fourth planet carrier 24*a* at the right side, and then, are output to the right wheel 42*a* that does not skid. That is, the two motor generators can output power with the wheel that does not skid, thereby greatly improving the capability of the vehicle 10000 of getting rid of the situation.

It may be understood that in this case, the second braking device 61*a* releases the intermediate transmission assembly 4*b*. That is, in this case, the second braking device 61*a* does not brake the intermediate transmission assembly 4*b*.

In some embodiments of the present disclosure in which a differential self-locking function can be implemented, the third braking device 62*a* may be a parking brake system (not shown) of the vehicle 10000. The parking brake system is configured to selectively brake one wheel in one pair of wheels (linked to the third planet carrier 14*a* and the fourth planet carrier 24*a*) independently, so as to brake a planet carrier connected to the wheel. For example, when the left wheel skids, the parking brake system may independently brake the left planet carrier (for example, the third planet carrier 14a) corresponding to the left wheel, or when the right wheel skids, the parking brake system may independently brake the right planet carrier (for example, the fourth planet carrier 24a) corresponding to the right wheel.

Certainly, the present disclosure is not limited thereto. For example, the third braking device 62a may be a service brake system of the vehicle 10000. A process of implementing a differential self-locking function is basically the same as that of the parking brake system, and details are not described herein again for brevity.

It should be noted that the parking brake system or the service brake system may be different from a known and widely-applied parking brake system or service brake system. An exemplary description is provided by using a parking brake system as an example. An existing widely-applied parking brake system generally brakes a pair of wheels, for example, the pair of rear wheels, at the same time (for example, brakes the wheels by tensioning a rear brake shoe with an inhaul cable), while the parking brake system in this embodiment of the present disclosure needs to separately brake the two wheels in one pair of wheels, for example, independently brakes the left rear wheel (in this case, the right rear wheel may be in a non-braking state) or independently brakes the right rear wheel (in this case, the left rear wheel may be in a non-braking state). Since a person of ordinary skill in the art already knows the construction and the principle of the conventional parking brake system, the person of ordinary skill in the art only needs to make simple variation and/or modification to the conventional parking brake system, so that the parking brake system in this embodiment of the present disclosure can separately and selectively brake the two wheels in the pair of wheels. For example, the parking brake system has two sub-systems, and each sub-system corresponds to one wheel. For example, one subsystem brakes the left rear wheel by tensioning the left rear brake shoe with the inhaul cable, and the other subsystem brakes the right rear wheel by tensioning the right rear brake shoe with the inhaul cable (an example of the in haul cable is merely exemplary, and any other implementable existing manner or an equivalent manner may be used, and certainly, a full electric manner may be used).

Based on a similar reason, the service brake system may be different from an existing widely-applied service brake system. Certainly, a person skilled in the art can understand and implement the difference between the service brake system in this embodiment of the present disclosure and the conventional service brake system when knowing the difference. Therefore, details are not described herein.

In another embodiment of the present disclosure, the power-driven system 100a may implement the differential self-locking function with another part having a braking function.

For example, in some embodiments, as shown in FIG. 16, the third braking device 62a is configured to selectively connect the third planet carrier 14a or the fourth planet carrier 24a to a housing of the power-driven system 100a, to brake the third planet carrier 14a or the fourth planet carrier 24a.

Further, as shown in FIG. 17, there may be two third braking devices 62a, for example, third braking devices 621a and 622a, and the two third braking devices respectively correspond to the third planet carrier 14a and the fourth planet carrier 24a. That is, each planet carrier corresponds to one third braking device, and the two third braking devices 621a and 622a are independent of each other and do not interfere with each other. Certainly, as shown in FIG. 16, the third planet carrier 14a and the fourth planet carrier 24a may share one third braking device 62a. In some embodiments of the present disclosure, the third braking device 62a may be a synchronizer or a brake. However, this is not limited thereto.

In the foregoing description, when the vehicle 10000 skids, the planet carrier corresponding to the skidding wheel can be braked with the third braking device 62a, so that the motor generator corresponding to the skidding wheel outputs power to the wheel at the other side that does not skid. In this case, the motor generator corresponding to the skidding wheel and the motor generator corresponding to the wheel that does not skid can output power together. Therefore, in this embodiment of the present disclosure, when the wheel at one side skids, each motor generator can work as an electric motor and rotates at a same direction throughout. Therefore, the two motor generators, especially the motor generator corresponding to the skidding wheel, do not need to reverse. This simplifies a control policy, and can shorten time of the vehicle 10000 of getting rid of the situation, so that the vehicle 10000 can get rid of the situation rapidly and efficiently.

Certainly, it may be understood that when the fourth motor generator 31a and the fifth motor generator 32a drive the vehicle 10000 to move forward, the two motor generators may rotate in the same direction throughout.

In this way, when the vehicle moves forward and suddenly enters a road having a poor road condition, for example, a wheel at one side skids, the third braking device 62a is controlled to brake a planet carrier corresponding to the skidding wheel, so that a motor generator at this side rapidly outputs power to the other side with the intermediate transmission assembly 4b, the power is coupled with power of a motor generator at the other side, and the coupled power is directly output. In this period, since the motor generator corresponding to the skidding wheel does not need to reverse, that is, does not need to stop and rotate at the other side, when the wheel skids, the two motor generators can perform power coupling rapidly, and together drive the wheel that does not skid, thereby greatly improving timeliness of the vehicle 10000 of getting rid of the situation.

For how to implement a solution in which a motor generator can implement power coupling without reversing, a person skilled in the art can design, based on the disclosed principle, the intermediate transmission assembly 4b satisfying the requirement. The present disclosure is described exemplarily by using a specific embodiment. Certainly, it should be understood that the following embodiment is merely exemplary, but cannot be understood as a limitation to the protection scope of the present disclosure or as an implication that the intermediate transmission assembly 4b having the following construction must be used in the power-driven system 100a. A person skilled in the art can make modification and/or alternation to the following embodiment and a technical feature of an equivalent solution after reading the principle of the specification and the following specific embodiment, and an embodiment formed after the variation should fall within the protection scope of the present disclosure.

For example, as shown in FIG. 13 to FIG. 17, the intermediate transmission assembly 4b may include an intermediate shaft 41b, and a first gear 42b of the intermediate shaft and a second gear 44b of the intermediate shaft are disposed on the intermediate shaft 41b. The first gear 42b of the intermediate shaft may be linked to the third ring gear 13a with an intermediate idle gear 43b, and the second gear 44b of the intermediate shaft is linked to the fourth ring gear 23a. Certainly, in some other embodiments of the present disclosure, the second gear 44*b* of the intermediate shaft may be linked to the fourth ring gear 23*a* with the intermediate idle gear 43*b*, and the first gear 42*b* of the intermediate shaft is linked to the third ring gear 13*a*.

The first gear 42*b* of the intermediate shaft and the second gear 44*b* of the intermediate shaft may be fixedly disposed on the intermediate shaft 41*b*, and preferably, a radial size of the first gear 42*b* of the intermediate shaft is different from a radial size of the second gear 44*b* of the intermediate shaft. For example, the radial size of the intermediate shaft gear meshing with the intermediate idle gear 43*b* is relatively small. In the embodiments of FIG. 9 to FIG. 13, the radial size of the first gear 42*b* of the intermediate shaft is less than the radial size of the second gear 44*b* of the intermediate shaft. Therefore, it can be ensured that an axial direction of the intermediate shaft 41*b* is the same as an axial direction of the power output shaft (the axle shaft) or the motor generator, thereby improving the transmission reliability and stability.

Further, outer teeth 131*a* and outer teeth 231*a* may be respectively disposed on outer peripheries of the third ring gear 13*a* and the fourth ring gear 23*a*, and the first gear 42*b* of the intermediate shaft is linked to the outer teeth 131*a* of the third ring gear 13*a* with the intermediate idle gear 43*b*. For example, the intermediate idle gear 43*b* separately meshes with the first gear 42*b* of the intermediate shaft and the outer teeth 131*a* of the third ring gear 13*a*. The second gear 44*b* of the intermediate shaft is linked to the outer teeth 231*a* of the fourth ring gear 23*a*. For example, the second gear 44*b* of the intermediate shaft directly meshes with the outer teeth 231*a* of the fourth ring gear 23*a*.

In the embodiments of FIG. 13 to FIG. 17, the second braking device 61*a* may be a brake and is used to brake the intermediate shaft 41*b*. Therefore, a structure of the power-driven system 100*a* is more compact, facilitating arrangement.

The following describes a drive manner between a planet carrier and a wheel. The power-driven system 100*a* may include a first power output shaft 43*a* and a second power output shaft 44*a*. The first power output shaft 43*a* is disposed between the third planet carrier 14*a* and one wheel 41*a* in the second pair of wheels of the vehicle 10000, the second power output shaft 44*a* is disposed between the fourth planet carrier 24*a* and the other wheel 42*a* in the second pair of wheels, and the pair of wheels may be a pair of front wheels, or may be a pair of rear wheels.

In some embodiments of the present disclosure, the fourth motor generator 31*a* and the third sun gear 11*a* may be coaxially freely sleeved on the first power output shaft 43*a*, and the fifth motor generator 32*a* and the fourth sun gear 21*a* may be coaxially freely sleeved on the second power output shaft 44*a*, so that the structure of the power-driven system 100*a* is more compact. In addition, the fourth motor generator 31*a* and the fifth motor generator 32*a* may be disposed in a bilaterally symmetric manner. The first epicyclic gearing 1*a* and the second epicyclic gearing 2*a* may be disposed in a bilaterally symmetric manner. In addition, the fourth motor generator 31*a* and the fifth motor generator 32*a* may be respectively located at an outside of the first epicyclic gearing 1*a* and an outside of the second epicyclic gearing 2*a*. That is, for example, in FIG. 13, the fourth motor generator 31*a* is located at the outside, that is, the left side, of the first epicyclic gearing 1*a*, and the fifth motor generator 32*a* is located at the outside, that is, the right side, of the second epicyclic gearing 2*a*.

In some embodiments of the present disclosure, the first power output shaft 43*a* and the second power output shaft 44*a* may be axle shafts. For example, the first power output shaft 43*a* may be a left axle shaft, and the second power output shaft 44*a* may be a right axle shaft.

Figure 15:
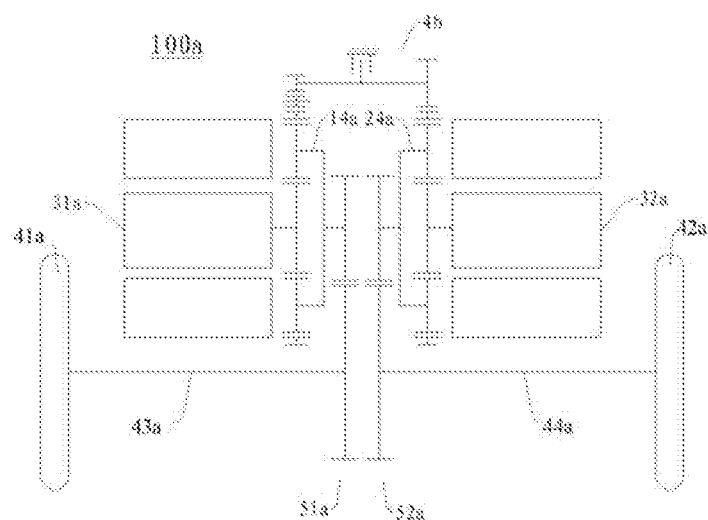

In some embodiments of the present disclosure, as shown in FIG. 15, a first reduction gear assembly 51*a* may be disposed between the first power output shaft 43*a* and the third planet carrier 14*a*, and a second reduction gear assembly 52*a* is disposed between the second power output shaft 44*a* and the fourth planet carrier 24*a*. A structure of the first reduction gear assembly 51*a* may be the same as a structure of the second reduction gear assembly 52*a*, thereby improving universality of a reduction gear assembly and reducing the costs. In addition, the reduction gear assembly is disposed between the power output end of the power-driven system 100*a* and the wheel, so that an effect of speed reduction and torque increase can be better achieved.

The following describes a construction, a connection relationship, and typical working conditions of the power-driven system 100*a* in the embodiment of FIG. 13 with reference to the accompanying drawings.

As shown in FIG. 13, the power-driven system 100*a* shown in this embodiment mainly includes two one-row epicyclic gearings 1*a* and 2*a*, two motor generators 31*a* and 32*a*, the intermediate transmission assembly 4*b*, two braking devices 61*a* and 62*a*, and the like.

Specifically, the first epicyclic gearing 1*a* at the left side includes the third sun gear 11*a*, the third planet gear 12*a*, and the third ring gear 13*a*. The third sun gear 11*a* is freely sleeved on the first power output shaft 43*a*, the third sun gear 11*a* is connected to the fourth motor generator 31*a*, and the fourth motor generator 31*a* is freely sleeved on the first power output shaft 43*a*. The third planet gear 12*a* is a duplicate gear, and is mounted on the third planet carrier 14*a*, and the third planet gear 12*a* separately meshes with the third sun gear 11*a* and the third ring gear 13*a*.

Similarly, the second epicyclic gearing 2*a* at the right side includes the fourth sun gear 21*a*, the fourth planet gear 22*a*, and the fourth ring gear 23*a*. The fourth sun gear 21*a* is freely sleeved on the second power output shaft 44*a*, the fourth sun gear 21*a* is connected to the fifth motor generator 32*a*, and the fifth motor generator 32*a* is freely sleeved on the second power output shaft 44*a*. The fourth planet gear 22*a* is a duplicate gear, and is mounted on the fourth planet carrier 24*a*, and the fourth planet gear 22*a* separately meshes with the fourth sun gear 21*a* and the fourth ring gear 23*a*.

The first gear 42*b* of the intermediate shaft and the second gear 44*b* of the intermediate shaft are fixedly disposed on the intermediate shaft 41*b*, the second braking device 61*a* may be a brake and is used to brake the intermediate shaft 41*b*, the first gear 42*b* of the intermediate shaft may be linked to the outer teeth 131*a* of the third ring gear 13*a* with the intermediate idle gear 43*b*, and the second gear 44*b* of the intermediate shaft may be directly linked to the outer teeth 231*a* of the fourth ring gear 23*a*.

The first power output shaft 43*a* is connected to the left wheel 41*a* and the third planet carrier 14*a*, and the second power output shaft 44*a* is connected to the right wheel 42*a* and the fourth planet carrier 24*a*.

The third braking device 62*a* is configured to selectively brake the third planet carrier 14*a* or the fourth planet carrier 24*a*. It may be understood that the braking may be direct braking or indirect braking.

The following describes typical working conditions of the power-driven system 100*a* in the embodiment of FIG. 13.

Full electric working condition (relying on the fourth motor generator 31*a* and the fifth motor generator 32*a*):

The second braking device 61a brakes the intermediate shaft 41b, so that the third ring gear 13a and the fourth ring gear 23a are indirectly braked. The fourth motor generator 31a and the fifth motor generator 32a may separately work as an electric motor. Therefore, power generated by the fourth motor generator 31a is transmitted to the left wheel 41a with the third sun gear 11a, the third planet gear 12a, the third planet carrier 14a, and the first power output shaft 43a, and a rotational speed of the fourth motor generator 31a is positively related to a rotational speed of the left wheel 41a. Power generated by the fifth motor generator 32a is transmitted to the right wheel 42a with the fourth sun gear 21a, the fourth planet gear 22a, the fourth planet carrier 24a, and the second power output shaft 44a, and a rotational speed of the fifth motor generator 32a is positively related to a rotational speed of the right wheel 42a.

Since the fourth motor generator 31a and the fifth motor generator 32a work independently and do not interfere with each other, the two motor generators can adaptively adjust output rotational speeds according to torque required by corresponding wheels, thereby implementing a differential function.

It may be understood that in this working condition, the fourth motor generator 31a and the fifth motor generator 32a may rotate clockwise or counterclockwise, thereby implementing full electric forwarding or full electric backing.

Skid Working Condition:

An exemplary description is provided by using an example in which the left wheel 41a skids. The third braking device 62a brakes the third planet carrier 14a, and at the same time, the second braking device 61a is in a disconnected state. The fourth motor generator 31a outputs the generated power to the fourth planet carrier 24a with the third sun gear 11a, the third planet gear 12a, the third planet carrier 14a, the third ring gear 13a, the intermediate idle gear 43b, the first gear 42b of the intermediate shaft, the intermediate shaft 41b, the second gear 44b of the intermediate shaft, and the fourth ring gear 23a, and at the same time, the power of the fifth motor generator 32a is also output to the fourth planet carrier 24a. The power of the fourth motor generator and the power of the fifth motor generator are coupled and are output to the right wheel 42a with the second power output shaft 44a. Therefore, when the left wheel skids, the fourth motor generator 31a at the left side still can output power to the right wheel that does not skid, and the fourth motor generator 31a does not need to reverse, thereby greatly improving the timeliness and a success rate of getting rid of the situation.

Coasting in Neutral:

The second braking device 61a and the third braking device 62a both are in the disconnected state, and the fourth motor generator 31a and the fifth motor generator 32a are in a follow-up state.

Braking Energy Recycling:

The second braking device 61a brakes the intermediate shaft 41b, and the third braking device 62a is in a disconnected state. Braking energy is output to corresponding motor generators with respective power output shafts and epicyclic gearings, to drive the motor generators to generate electricity.

The following briefly describes the vehicle 10000 in the embodiments of the present disclosure. Referring to FIG. 18, the vehicle 10000 includes the power-driven system 1000 and the driving system 100a in the foregoing embodiments. The power-driven system 1000 in FIG. 1 to FIG. 6 may be applied to front engine front drive, so that the power coupling device 100 of the power-driven system 1000 drives a pair of front wheels. The driving system 100a in FIG. 7 to FIG. 17 may be applied to rear engine rear drive. In addition, the vehicle 10000 shown in FIG. 19 may include only a part applied to front engine front drive in the power-driven system 1000. Certainly, the present disclosure is not limited thereto. It should be understood that other constructions of the vehicle 10000 in the embodiments of the present disclosure, for example, a brake system, a traveling system, and a steering system, are existing technologies, and are well known by a person skilled in the art. Therefore, details are not described herein.

In the descriptions of this specification, descriptions of terms "one embodiment", "some embodiments", "example", "specific example", "some examples", and the like indicate that specific features, structures, materials, or characteristics described with reference to the embodiments or examples are included in at least one embodiment or example of the present disclosure. In this specification, illustrative expressions using the foregoing terms do not necessarily indicate the same embodiments or examples. In addition, the described specific features, structures, materials, or characteristics may be combined in an appropriate manner in any one or more embodiments or examples. In addition, a person skilled in the art may combine different embodiments or examples described in this specification.

Although the embodiments of the present disclosure have been shown and described above, it can be understood that, the foregoing embodiments are exemplary and should not be understood as a limitation to the present disclosure. A person of ordinary skill in the art can make changes, modifications, replacements, or variations to the foregoing embodiments within the scope of the present disclosure.

What is claimed is:

1. A power-driven system, comprising:
    a power coupling device, wherein the power coupling device comprises:
    a first sun gear, a first planet carrier, a first ring gear, a second sun gear, a second planet carrier, and a second ring gear, and a power transmission part coaxially linked to the first sun gear and the second sun gear;
    a first motor generator and a second motor generator, wherein the first motor generator is linked to the first ring gear, and the second motor generator is linked to the second ring gear;
    a power source configured to selectively connect to the power transmission part, wherein the power source comprises an engine and a third motor generator, the engine is connected to the power transmission part via a first link, and the third motor generator is connected to the power transmission part via a second link different from the first link; and
    a first braking device configured to brake the power transmission part.

2. The power-driven system according to claim 1, further comprising a first power connection device disposed between the power source and the power transmission part, wherein the first power connection device is used to connect the power transmission part with the power source or disconnect the power transmission part from the power source, and the first power connection device is selected from a group consisting of a synchronizer and a clutch.

3. The power-driven system according to claim 2, further comprising an input shaft and an intermediate shaft, wherein the input shaft is linked to the intermediate shaft, the power source is linked to the input shaft, and the intermediate shaft is connected to the power transmission part with the first power connection device.

4. The power-driven system according to claim 3, wherein the synchronizer is disposed on the power transmission part and is used to connect to the intermediate shaft.

5. The power-driven system according to claim 3, further comprising:
an input shaft fixed gear disposed on the input shaft; and
an intermediate shaft fixed gear disposed on the intermediate shaft, wherein the input shaft fixed gear meshes with the intermediate shaft fixed gear.

6. The power-driven system according to claim 3, wherein the third motor generator is linked to the input shaft with a gear mechanism in the second link, and the engine is coaxially linked to the input shaft in the first link.

7. The power-driven system according to claim 2, further comprising an input shaft, wherein the first power connection device is disposed between the input shaft and the power transmission part.

8. The power-driven system according to claim 7, wherein the engine is coaxially linked to the input shaft in the first link, and the third motor generator is linked to the input shaft with a gear mechanism in the second link.

9. The power-driven system according to claim 7, wherein:
the power source comprises an engine and a third motor generator; and
the clutch is disposed between the input shaft and the power transmission part, the clutch comprises a first connection part and a second connection part, the engine is connected to the first connection part, the power transmission part is connected to the second connection part, and the third motor generator is linked to the first connection part.

10. The power-driven system according to claim 1, wherein the first braking device is selected from a group consisting of a brake and a synchronizer.

11. The power-driven system according to claim 1, wherein the first braking device is located between the first sun gear and the second sun gear.

12. The power-driven system according to claim 1, wherein the first planet carrier and the second planet carrier are constructed as power output ends of the power-driven system, a first planet carrier output gear is coaxially disposed on the first planet carrier, and a second planet carrier output gear is coaxially disposed on the second planet carrier.

13. The power-driven system according to claim 1, wherein the power transmission part is constructed as a power transmission shaft.

14. The power-driven system according to claim 1, wherein
a quantity of teeth of the first sun gear is the same as a quantity of teeth of the second sun gear, a first planet gear is disposed between the first sun gear and the first ring gear, a second planet gear is disposed between the second sun gear and the second ring gear, a quantity of teeth of the first planet gear is the same as a quantity of teeth of the second planet gear, and a quantity of teeth of the first ring gear is the same as a quantity of teeth of the second ring gear.

15. The power-driven system according to claim 2, wherein
the first power connection device, the first sun gear, the first planet carrier, and the first ring gear are accommodated inside the first motor generator, and
the first braking device, the second sun gear, the second planet carrier, and the second ring gear are accommodated inside the second motor generator.

16. The power-driven system according to claim 1, wherein
the power coupling device is used to drive a first pair of wheels of a vehicle; and
the power-driven system further comprises:
a fourth motor generator and a fifth motor generator;
a first power output shaft, a second power output shaft, multiple first epicyclic gearing s, and multiple second epicyclic gearings, wherein the multiple first epicyclic gearings are disposed in series between the fourth motor generator and the first power output shaft and configured to output power of the fourth motor generator to the first power output shaft after speed changing is performed on the power, the multiple second epicyclic gearings are disposed in series between the fifth motor generator and the second power output shaft and configured to output power of the fifth motor generator to the second power output shaft after speed changing is performed on the power, the multiple first epicyclic gearing s share one first sharing ring gear, the multiple second epicyclic gearings share one second sharing ring gear, the first power output shaft is connected to one wheel in a second pair of wheels of the vehicle, the second power output shaft is connected to the other wheel in the second pair of wheels, the first pair of wheels is one of a pair of front wheels and a pair of rear wheels, and the second pair of wheels is the other one of the pair of front wheels and the pair of rear wheels;
a second braking device and a third braking device, wherein the second braking device is configured to brake the first sharing ring gear, and the third braking device is configured to brake the second sharing ring gear; and
a second power connection device, wherein the second power connection device is configured to connect the first power output shaft and the second power output shaft.

17. The power-driven system according to claim 1, wherein
the power coupling device is used to drive a first pair of wheels of a vehicle; and
the power-driven system further comprises:
a first epicyclic gearing and a second epicyclic gearing, wherein the first epicyclic gearing comprises a third sun gear, a third planet carrier, and a third ring gear, and the second epicyclic gearing comprises a fourth sun gear, a fourth planet carrier, and a fourth ring gear;
a fourth motor generator and a fifth motor generator, wherein the fourth motor generator is linked to the third sun gear, and the fifth motor generator is linked to the fourth sun gear;
a first power output shaft and a second power output shaft, wherein the first power output shaft is disposed between the third planet carrier and one wheel in a second pair of wheels, the second power output shaft is disposed between the fourth planet carrier and the other wheel in the second pair of wheels, the first pair of wheels is one of a pair of front wheels and a pair of rear wheels, and the second pair of wheels is the other of the pair of front wheels and the pair of rear wheels;
a second braking device and a third braking device, wherein the second braking device is configured to brake the third ring gear, and the third braking device is configured to brake the fourth ring gear; and a second power connection device, wherein the second power connection device is configured to connect the first power output shaft and the second power output shaft.

18. The power-driven system according to claim 1, wherein
the power coupling device is used to drive a first pair of wheels of a vehicle; and
the power-driven system further comprises:
a first epicyclic gearing and a second epicyclic gearing, wherein the first epicyclic gearing comprises a third sun gear, a third planet carrier, and a third ring gear, the second epicyclic gearing comprises a fourth sun gear, a fourth planet carrier, and a fourth ring gear, the third planet carrier and the fourth planet carrier are constructed as power output ends to drive a second pair of wheels, the first pair of wheels is one of a pair of front wheels and a pair of rear wheels, and the second pair of wheels is the other one of the pair of front wheels and the pair of rear wheels;
a fourth motor generator and a fifth motor generator, wherein the fourth motor generator is linked to the third sun gear, and the fifth motor generator is linked to the fourth sun gear;
an intermediate transmission assembly, wherein the intermediate transmission assembly is configured to be separately linked to the third ring gear and the fourth ring gear; and
a second braking device, wherein the second braking device is configured to brake the intermediate transmission assembly.

19. The power-driven system according to claim 18, further comprising a third braking device, wherein the third braking device is configured to brake the third planet carrier or the fourth planet carrier.

20. A vehicle, comprising a power-driven system, wherein the power-driven system comprises:
a power coupling device, wherein the power coupling device comprises:
a first sun gear, a first planet carrier, a first ring gear, a second sun gear, a second planet carrier, and a second ring gear, and a power transmission part coaxially linked to the first sun gear and the second sun gear;
a first motor generator and a second motor generator, wherein the first motor generator is linked to the first ring gear, and the second motor generator is linked to the second ring gear;
a power source configured to selectively connect to the power transmission part, wherein the power source comprises an engine and a third motor generator, the engine is connected to the power transmission part via a first link, and the third motor generator is connected to the power transmission part via a second link different from the first link; and
a first braking device configured to brake the power transmission part.

* * * * *